US012748948B2

(12) United States Patent
Hashimoto et al.

(10) Patent No.: US 12,748,948 B2
(45) Date of Patent: Sep. 29, 2026

(54) INFERENCE SYSTEM, INFERENCE DEVICE, AND INFERENCE METHOD

(71) Applicants: OMRON CORPORATION, Kyoto (JP); KYOTO UNIVERSITY, Kyoto (JP)

(72) Inventors: Atsushi Hashimoto, Tokyo (JP); Masaaki Iiyama, Kyoto (JP); Ryuhei Takahashi, Kyoto (JP); Motoharu Sonogashira, Kyoto (JP)

(73) Assignees: OMRON CORPORATION, Kyoto (JP); KYOTO UNIVERSITY, Kyoto (JP)

( * ) Notice: Subject to any disclaimer, the term of this patent is extended or adjusted under 35 U.S.C. 154(b) by 1165 days.

(21) Appl. No.: 17/773,368

(22) PCT Filed: Nov. 9, 2020

(86) PCT No.: PCT/JP2020/041698

§ 371 (c)(1),
(2) Date: Apr. 29, 2022

(87) PCT Pub. No.: WO2021/095680

PCT Pub. Date: May 20, 2021

(65) Prior Publication Data

US 2022/0366221 A1 Nov. 17, 2022

(30) Foreign Application Priority Data

Nov. 14, 2019 (JP) ................................ 2019-206383

(51) Int. Cl.
*G06N 3/045* (2023.01)
*G06N 5/04* (2023.01)

(52) U.S. Cl.
CPC .............. *G06N 3/045* (2023.01); *G06N 5/04* (2013.01)

(58) Field of Classification Search
CPC .............................. G06N 5/04; G06N 3/0455
See application file for complete search history.

(56) References Cited

U.S. PATENT DOCUMENTS

2019/0244107 A1* 8/2019 Murez ..................... G06N 3/08
2019/0279075 A1* 9/2019 Liu ...................... G06N 3/0464
(Continued)

FOREIGN PATENT DOCUMENTS

CN 108062753 A 5/2018
CN 108875818 A 11/2018
(Continued)

OTHER PUBLICATIONS

Zhu, J.-Y., Park, T., Isola, P., & Efros, A. A. (2017). Unpaired Image-to-Image Translation using Cycle-Consistent Adversarial Networks. arXiv [Cs.CV]. Retrieved from http://arxiv.org/abs/1703.10593 (Year: 2017).*
(Continued)

*Primary Examiner* — Omar F Fernandez Rivas
*Assistant Examiner* — Corey M Sackalosky
(74) *Attorney, Agent, or Firm* — Sughrue Mion, PLLC

(57) ABSTRACT

An inference system includes: a learning unit that generates an inference model using a first dataset including a plurality of sample data whose ground truth is given and a second dataset including a plurality of sample data whose ground truth is not given; and an inference unit that determines an inference result. The inference model includes an encoder that calculates from sample data a first feature value independent of the first and second datasets and a second feature value dependent on the first or second dataset. The learning unit trains the encoder such that the same first feature value is calculated from any of first and second sample data for a pair of the first sample data among the first dataset and the second sample data which is among the second dataset and
(Continued)

whose ground truth is to be identical to the ground truth of the first sample data.

9 Claims, 14 Drawing Sheets

(56) References Cited

U.S. PATENT DOCUMENTS

| | | | | |
|---|---|---|---|---|
| 2019/0287016 | A1 | 9/2019 | Katoh et al. | |
| 2021/0142177 | A1* | 5/2021 | Mallya | G06N 3/082 |

FOREIGN PATENT DOCUMENTS

| | | | |
|---|---|---|---|
| CN | 108985362 | A | 12/2018 |
| CN | 109580215 | A | 4/2019 |
| CN | 110084863 | A | 8/2019 |
| JP | 2019-159538 | A | 9/2019 |
| JP | 2019-159835 | A | 9/2019 |
| WO | 2019/087987 | A1 | 5/2019 |

OTHER PUBLICATIONS

Isola, P., Zhu, J.-Y., Zhou, T., & Efros, A. A. (2018). Image-to-Image Translation with Conditional Adversarial Networks. arXiv [ Cs.CV]. Retrieved from http://arxiv.org/abs/1611.07004 (Year: 2018).*
Yoo, D., Kim, N., Park, S., Paek, A. S., & Kweon, I. S. (2016). Pixel-Level Domain Transfer. arXiv [Cs.CV]. Retrieved from http://arxiv.org/abs/1603.07442 (Year: 2016).*
Wang, Y., van de Weijer, J., & Herranz, L. (2018). Mix and match networks: encoder-decoder alignment for zero-pair image translation. arXiv [Cs.CV]. Retrieved from http://arxiv.org/abs/1804.02199 (Year: 2018).*
Hoffman, J., Tzeng, E., Park, T., Zhu, J.-Y., Isola, P., Saenko, K., . . . Darrell, T. (2017). CyCADA: Cycle-Consistent Adversarial Domain Adaptation. arXiv [Cs.CV]. Retrieved from http://arxiv.org/abs/1711.03213 (Year: 2017).*
Liu, M.-Y., Breuel, T., & Kautz, J. (2018). Unsupervised Image-to-Image Translation Networks. arXiv [Cs.CV]. Retrieved from http://arxiv.org/abs/1703.00848 (Year: 2018).*
Tan, S., Peng, X., & Saenko, K. (2019). Generalized Domain Adaptation with Covariate and Label Shift CO-Alignment. ArXiv, abs/1910.10320 (Year: 2019).*
Judy Hoffman et al., "CYCADA: Cycle-Consistent Adversarial Domain Adaptation", Proceedings of the 35th International Conference on Machine Learning, 2018, 12 pgs., vol. 80.
Paolo Russo et al., "From source to target and back: Symmetric Bi-Directional Adaptive GAN", The IEEE Conference on Computer Vision and Pattern Recognition (CVPR), 2018, pp. 8099-8108.
Ashish Shrivastava et al., "Learning from Simulated and Unsupervised Images through Adversarial Training", The IEEE Conference on Computer Vision and Pattern Recognition (CVPR), 2017, pp. 2107-2116.
International Search Report for PCT/JP2020/041698 dated, Dec. 22, 2020 (PCT/ISA/210).
Written Opinion of the International Searching Authority for PCT/JP2020/041698 dated Dec. 22, 2020 (PCT/ISA/237).
Extended European Search Report dated Oct. 27, 2023 issued by the European Patent Office in European Application No. 20888588.9.
S. Tan et al: "Generalized Domain Adaptation with Covariate and Label Shift CO-ALignment", arxiv.org, Cornell University Library, 201 Olin Library Cornell University Ithaca, NY 14853, Oct. 23, 2019 (Oct. 23, 2019), XP081519404, DOI: 10.48550/arXiv.1910.10320v1 (17 pages total).
A Gabourie et al: "Learning a Domain-Invariant Embedding for Unsupervised Domain Adaptation Using Class-Conditioned Distribution Alignment", IEEE, 57th Annual Allerton Conference on Communication, Control, and Computing (Allerton'19), Sep. 24-27, 2019, pp. 352-359, XP033646132, DOI: 10.1109/ALLERTON.2019.8919960.
J. Manders et al: "Adversarial Alignment of Class Prediction Uncertainties for Domain Adaptation", arxiv.org, Cornell University Library, 201 Olin Library Cornell University Ithaca, NY 14853, Jan. 4, 2019 (Jan. 4, 2019), XP081014818, DOI: 10.48550/arXiv.1804.04448v2 (11 pages total).
Decision to Grant a Patent dated Apr. 25, 2023 from the Japanese Patent Office in Application No. 2019-206383.
Liu et al., "Research Progress on Application of Generative Adversarial Networks in Various Fields", Acta Automatica Sinica, , vol. 46 , Issue 12, Jun. 25, 2019, pp. 2500-2536.
Communication dated May 30, 2025 issued by China Patent Office in Application No. 202080074614.8.
Liu Jian-Wei et al., "Research Progress on Application of Generative Adversarial Networks in Various Fields", Acta Automatica Sinica, , vol. 46 , No. 12, Dec. 2020, pp. 2500-2536.
Office Action dated Jan. 16, 2026 issued by China Patent Office in Application No. 202080074614.8.
Notice of Completion of Formalities for Patent Registration dated Jul. 14, 2026 in Chinese Application No. 202080074614.8.
Guoliang Kang et al., "Adversarial Attention Alignment for Unsupervised Domain Adaption: The Benefit of Target Expectation Maximazation", Computer Vision ECCV 2018, pp. 420 436.
Sun Wei: Stereo Target Recognition for Small Dataset Based on Generation Network and Classifiers Fusion, Xidian University in partial fulfillment of the requirements for the degree of Master in Circuits and Systems, Jun. 2018.

* cited by examiner

INFERENCE SYSTEM, INFERENCE DEVICE, AND INFERENCE METHOD

CROSS REFERENCE TO RELATED APPLICATIONS

This application is a National Stage of International Application No. PCT/JP2020/041698 filed Nov. 9, 2020, claiming priority based on Japanese Patent Application No. 2019-206383 filed Nov. 14, 2019, the entire contents of each of which being herein incorporated by reference in their entireties.

TECHNICAL FIELD

The present invention relates to a machine learning method that can be adapted to actual operation.

BACKGROUND ART

In recent years, a solution called artificial intelligence (AI) using computing capability is implemented in various fields due to dramatic improvement in computing capability.

One such approach is a cyber physical system (CPS). The cyber physical system includes various attempts to solve social problems by being conscious of an association with the real world and using the computing capability.

Various elemental technologies are required to implement the cyber physical system, and an unsupervised domain adaptation problem is known as one of various elemental technologies. NPL 1, NPL 2, and NPL 3 disclose applying a technique called a cycleGAN to the unsupervised domain adaptation problem.

CITATION LIST

Non Patent Literatures

NPL 1: Judy Hoffman, Eric Tzeng, Taesung Park, Jun-Yan Zhu, Phillip Isola, Kate Saenko, Alexei Efros, Trevor Darrell, "CyCADA: Cycle-Consistent Adversarial Domain Adaptation," Proceedings of the 35th International Conference on Machine Learning, "PMLR 80: 1989-1998, 2018, [searched on Nov. 8, 2019], Internet <URL: https://github.com/jhoffman/cycada_release>

NPL 2: Paolo Russo, Fabio M. Carlucci, Tatiana Tommasi, Barbara Caputo, "From Source to Target and Back: Symmetric Bi-Directional Adaptive GAN," The IEEE Conference on Computer Vision and Pattern Recognition (CVPR), 2018, pp. 8099-8108, [Searched on Nov. 8, 2019], Internet <URL: http://openaccess.thecvf.com/content_cvpr_2018/html/Russo_From_Source_to_CVPR_2018_paper.html>

NPL 3: Ashish Shrivastava, Tomas Pfister, Oncel Tuzel, Joshua Susskind, Wenda Wang, Russell Webb, "Learning From Simulated and Unsupervised Images Through Adversarial Training," The IEEE Conference on Computer Vision and Pattern Recognition (CVPR), 2017, pp. 2107-2116, [searched on Nov. 8, 2019], Internet <URL: https://arxiv.org/abs/1612.07828>

SUMMARY OF INVENTION

Technical Problem

An object of the present invention is to provide a technique capable of generating a trained model with higher inference performance than the conventional methods disclosed in NPL 1, NPL 2, and NPL 3.

Solution to Problem

An inference system according to an example of the present invention includes a learning unit configured to generate an inference model using a first dataset including a plurality of sample data whose ground truth is given and a second dataset including a plurality of sample data whose ground truth is not given; and an inference unit configured to input inference target data that can belong to the second dataset to the inference model to determine an inference result. The inference model includes an encoder configured to calculate from the sample data a first feature value independent of the first dataset and the second dataset and a second feature value dependent on the first dataset or the second dataset. The learning unit is configured to train the encoder such that the same first feature value is calculated from both first sample data and second sample data for a pair of the first sample data among the first dataset and the second sample data which is among the second dataset and whose ground truth is to be identical to the ground truth of the first sample data.

According to this configuration, the encoder is used which is configured to calculate the first feature value independent of the first dataset and the second dataset and the second feature value dependent on the first dataset or the second dataset from the sample data among each dataset. Then, focusing on the first feature value instead of the second feature value, inference accuracy of the inference model can be enhanced without knowing a shape of the distribution of the second dataset.

The learning unit may be configured to generate the inference model by a training network that is an adversarial network. According to this configuration, the inference model can be efficiently trained by the adversarial network.

The training network may include a first encoder-decoder including a first encoder and a first decoder and a second encoder-decoder including a second encoder and a second decoder. In training by the learning unit, a sample among the first dataset may be input to a first network in which the first encoder-decoder and the second encoder-decoder are disposed in this order, and a sample among the second dataset may be input to a second network in which the second encoder-decoder and the first encoder-decoder are disposed in this order. According to this configuration, the first encoder-decoder and the second encoder-decoder are made different in disposition order while being made common, so that the inference model can be more efficiently trained by the adversarial network.

The learning unit may be configured to optimize model parameters of the first encoder, the first decoder, the second encoder, and the second decoder such that an error between the first feature value output from the first encoder and a first pseudo feature value output from the second encoder is minimized by inputting the sample among the first dataset to the first network, and the learning unit may be configured to optimize the model parameters of the first encoder, the first decoder, the second encoder, and the second decoder such that an error between the first feature value output from the second encoder and a first pseudo feature value output from the first encoder is minimized by inputting the sample among the second dataset to the second network. According to this configuration, the model parameters of the inference model can be efficiently trained by minimizing the error between the first feature value calculated from the sample and the first pseudo feature value calculated from the first feature value through the decoder and the encoder.

The learning unit may be further configured to train a discriminator, to which output from the encoder is input, based on sample data among the first dataset and corresponding ground truth. The inference model may further include the discriminator. According to this configuration, training for inference (discrimination) by the inference model can be efficiently performed.

An inference device according to another example of the present invention includes a storage configured to hold an inference model generated by training using a first dataset including a plurality of sample data whose ground truth is given and a second dataset including a plurality of sample data whose ground truth is not given; and an inference unit configured to input inference target data that can belong to the second dataset to the inference model to determine an inference result. The inference model includes an encoder configured to calculate from the sample data a first feature value independent of the first dataset and the second dataset and a second feature value dependent on the first dataset or the second dataset. The encoder is trained such that the same first feature value is calculated from both first sample data and second sample data for a pair of the first sample data among the first dataset and the second sample data which is among the second dataset and whose ground truth is to be identical to the ground truth of the first sample data.

An inference method according to still another example of the present invention includes generating an inference model using a first dataset including a plurality of sample data whose ground truth is given and a second dataset including a plurality of sample data whose ground truth is not given; and inputting inference target data that can belong to the second dataset to the inference model to determine an inference result. The inference model includes an encoder configured to calculate from the sample data a first feature value independent of the first dataset and the second dataset and a second feature value dependent on the first dataset or the second dataset. The generating an inference model includes training the encoder such that the same first feature value is calculated from both first sample data and second sample data for a pair of the first sample data among the first dataset and the second sample data which is among the second dataset and whose ground truth it to be identical to the ground truth of the first sample data.

Advantageous Effects of Invention

According to the present invention, the trained model with higher inference performance can be generated as compared with the conventional method.

DESCRIPTION OF EMBODIMENT

Figure 1:
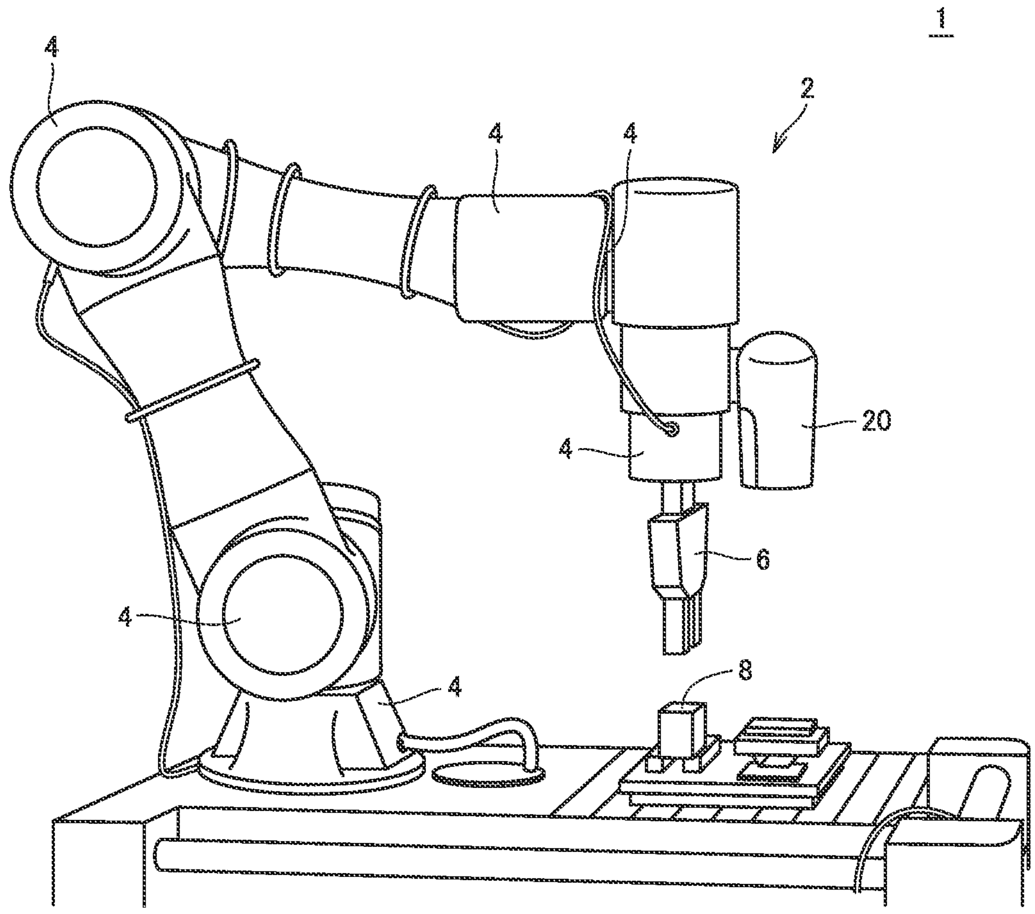
FIG. 1 is a schematic diagram illustrating a configuration example of a robot system according to an embodiment.

With reference to the drawings, an embodiment of the present invention will be described in detail. The same or equivalent portion in the drawings is denoted by the same reference numeral, and the description will not be repeated.

A. Application Example

An example of a scene to which the present invention is applied will be described.

FIG. 1 is a schematic diagram illustrating a configuration example of a robot system 1 according to an embodiment. With reference to FIG. 1, robot system 1 specifies a position and/or a type of a workpiece 8 by image recognition, grips workpiece 8 by a hand 6 disposed at a distal end of an arm, and performs a necessary operation.

As an example, a robot 2 is an articulated robot and has a plurality of shafts 4 corresponding to joints, and hand 6 disposed at a distal end can be disposed at an arbitrary position and in an arbitrary posture by rotation or movement of each shaft 4.

A camera 20 is disposed near hand 6, and recognition processing is performed on an image captured by camera 20, so that the position and/or a type of workpiece 8 is specified (inferred).

In robot system 1 of the embodiment, an inference model that is a trained model constructed previously by machine learning as described later is used. In order to improve inference accuracy of the inference model, the machine learning is required to be performed using a learning dataset including a large number of pieces of teacher data.

On the other hand, ground truth (label) is required to be previously given to the teacher data, and it is not easy to prepare the large number of pieces of teacher data. For this reason, a technique, in which the workpiece is virtually imaged (rendered or visualized) to prepare a large number of images (that is, the teacher data) whose ground truth is given while the workpiece in which the position and the type (that is, ground truth) are previously known in simulation is disposed, is used in many cases.

The inference accuracy can be enhanced by constructing the inference model using the large number of teacher data generated by the simulation.

However, workpiece 8 is captured by camera 20 in actual operation. Because the image generated by the simulation and the image actually captured by camera 20 do not have completely the same imaging condition or the like, the inference model constructed using the large number of pieces of teacher data generated by the simulation cannot be directly used for the actual operation in many cases.

The embodiment provides the configuration capable of operating the inference model constructed using the teacher data generated under a certain condition under a condition that is not necessarily the same.

Figure 2:
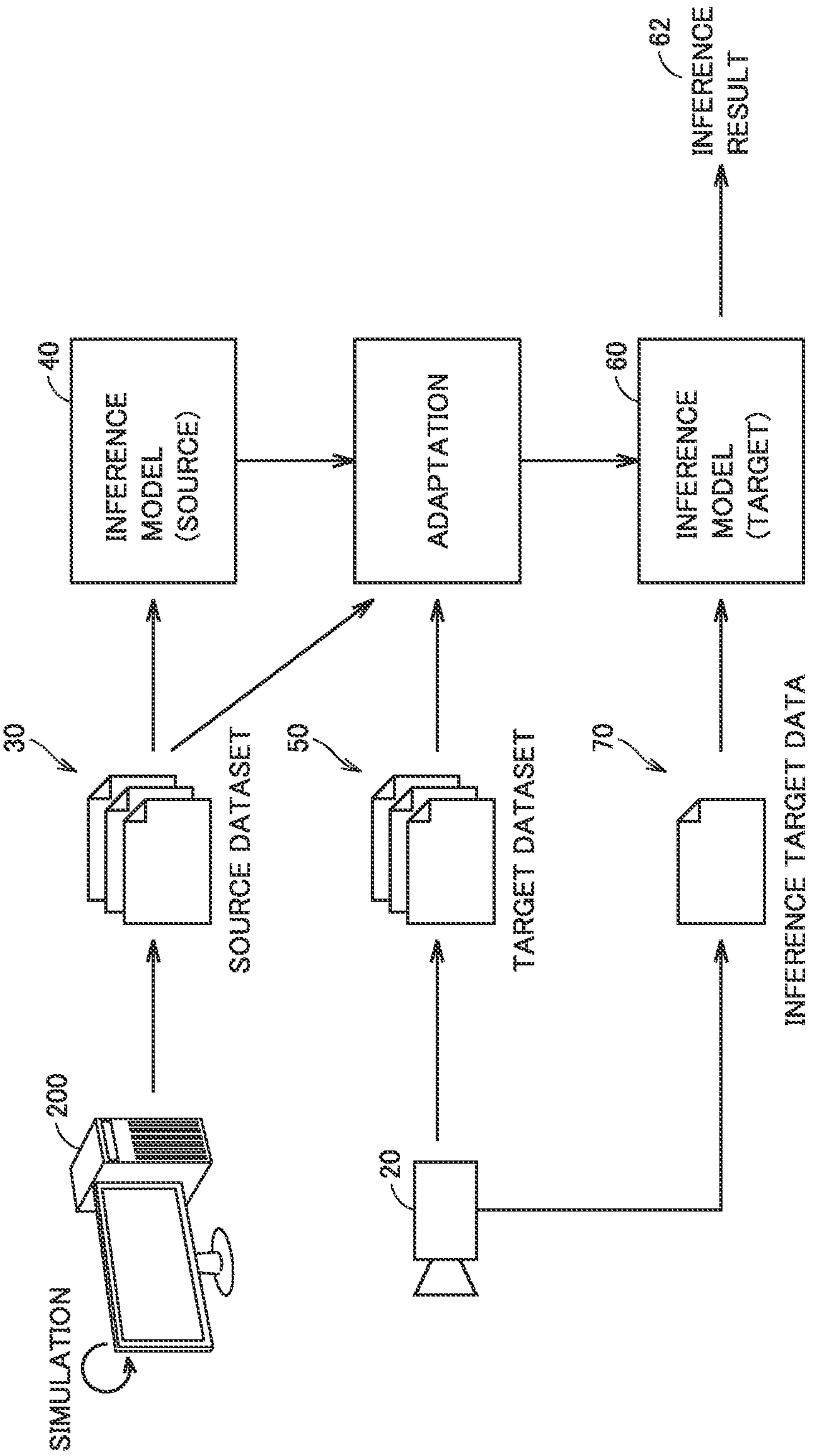
FIG. 2 is a schematic diagram illustrating a processing procedure related to construction and operation of an inference model of the embodiment.

FIG. 2 is a schematic diagram illustrating a processing procedure related to construction and operation of the inference model of the embodiment. With reference to FIG. 2, first, an inference model 40 is constructed using a dataset (hereinafter, also referred to as a "source dataset 30") including an image generated by a simulation device 200.

Constructed inference model 40 is adapted using a dataset (hereinafter, also referred to as a "target dataset 50") including an image used the actual operation, thereby generating an inference model 60. In the actual operation, data (hereinafter, referred to as "inference target data 70") is input to generated inference model 60, thereby outputting an inference result 62. Inference target data 70 corresponds to sample data that can belong to target dataset 50.

Inference model 40 is not necessarily constructed, but inference model 60 may be directly constructed from source dataset 30 and target dataset 50.

A detailed configuration and processing of robot system 1 that is a specific application example of the present invention will be described below.

B. Hardware Configuration of Robot System

An example of a hardware configuration of robot system 1 in FIG. 1 will be described below.

Figure 3:
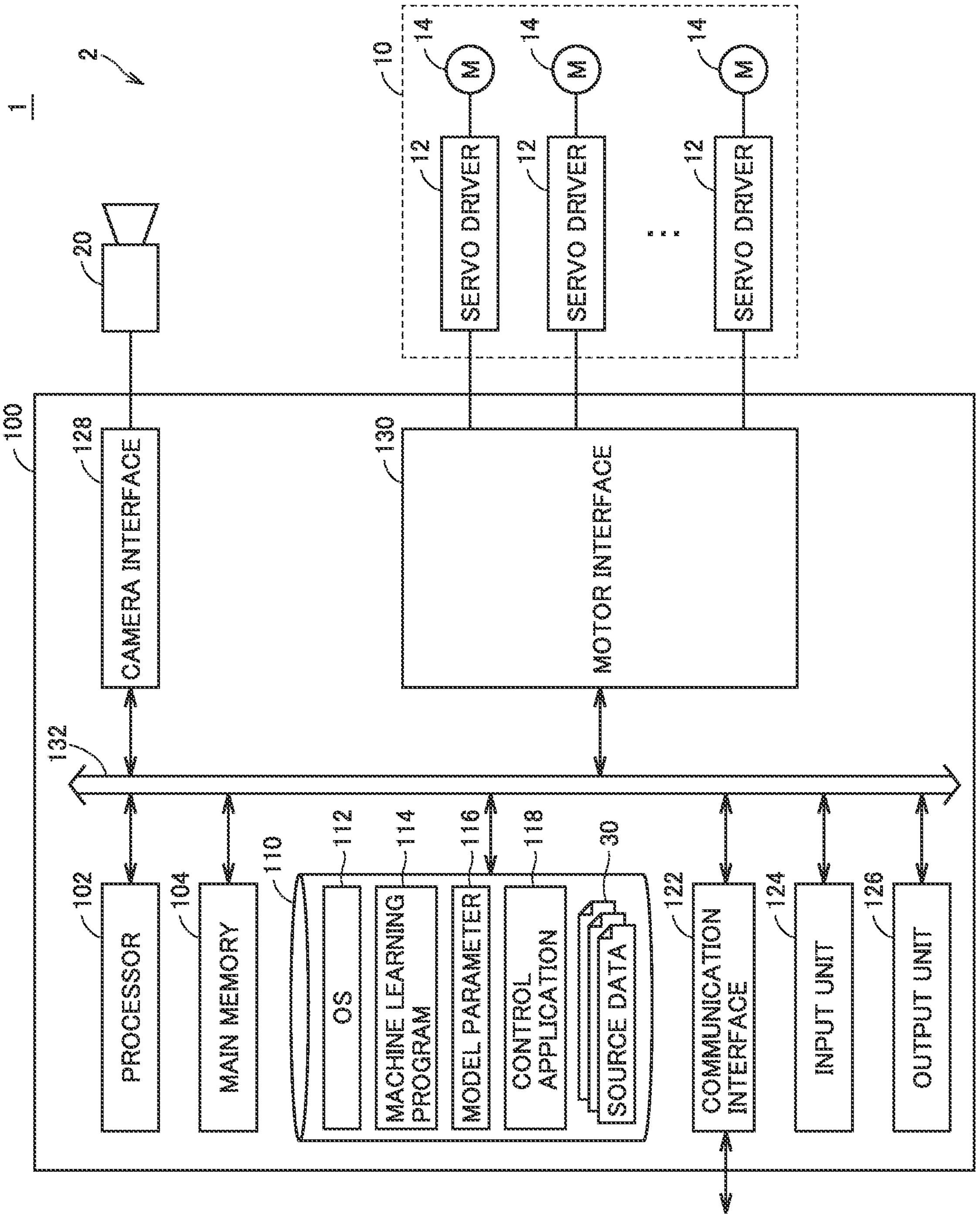
FIG. 3 is a schematic diagram illustrating a hardware configuration example of the robot system of the embodiment.

FIG. 3 is a schematic diagram illustrating an example of the hardware configuration in robot system 1 of the embodiment. With reference to FIG. 3, robot system 1 includes a robot 2 and a robot controller 100 that controls robot 2.

In addition to camera 20, robot 2 includes sets of servo driver 12 and motor 14 as many as the number of shafts.

Robot controller 100 is a device configuring the inference system of the embodiment, and controls robot 2 based on the image captured by camera 20. More specifically, robot controller 100 performs the recognition processing on the image captured from camera 20, and outputs a command to one or a plurality of servo drivers 12 according to the recognition result. When each of the servo drivers 12 supplies power according to a command, corresponding motor 14 is rotationally driven to operate the joint or arm of robot 2 mechanically coupled to the motor 14.

Robot controller 100 is typically implemented using a computer (for example, an industrial personal computer based on a general-purpose personal computer) according to a general-purpose architecture.

Robot controller 100 includes a processor 102, a main memory 104, a storage 110, a communication interface 122, an input unit 124, an output unit 126, a camera interface 128, and a motor interface 130 as components.

Processor 102 includes a central processing unit (CPU), a micro processing unit (MPU), a graphics processing unit (GPU), and the like. As processor 102, a configuration including a plurality of cores may be adopted, or a plurality of processors 102 may be disposed.

Main memory 104 includes a dynamic random access memory (DRAM), a static random access memory (SRAM), or the like. Storage 110 includes a nonvolatile storage device such as a hard disk drive (HDD) or a solid state drive (SSD). Processor 102 reads various programs stored in storage 110, expands the various programs in main memory 104, and executes the various programs to implement various pieces of processing as described later.

In addition to an OS 112 implementing a basic function, storage 110 stores a machine learning program 114, a model parameter 116 that defines the inference model, and a control application 118 that controls robot 2. Storage 110 corresponds to the storage that holds the inference model. Sometimes source dataset 30 is stored in storage 110.

Processor 102 executes machine learning program 114 to execute learning processing, thereby generating inference model 60. Processor 102 executes control application 118 to function as an inference unit that inputs inference target data 70 to inference model 60 to determine an inference result.

Communication interface 122 exchanges data with another device through any network.

Input unit 124 includes a keyboard, a mouse, and the like, and receives a user operation. Output unit 126 includes a display, various indicators, and a printer, and outputs a processing result and the like from processor 102.

Camera interface 128 receives the image captured by camera 20 and outputs a necessary command to camera 20.

Motor interface 130 outputs a necessary command to servo driver 12 according to an instruction from processor 102.

The program of robot controller 100 may be installed through a computer-readable recording medium (for example, an optical recording medium such as a digital versatile disc (DVD)), or may be installed by being downloaded from a server device or the like on a network. Sometimes functions provided by robot controller 100 of the embodiment are implemented using a part of modules provided by the OS.

Although the configuration example in which necessary functions of robot controller 100 are provided by processor 102 executing the program has been described in FIG. 3, some or all of these provided functions may be implemented using a dedicated hardware circuit (for example, an application specific integrated circuit (ASIC) and a field-programmable gate array (FPGA)).

C. Unsupervised Domain Adaptation Problem

First, an unsupervised domain adaptation problem will be described. As described with reference to FIGS. 1 and 2, it is assumed that there are datasets (source dataset 30 and target dataset 50) having different biases (tendencies) from each other. At this point, the bias is typically caused by a difference between an environment (hereinafter, also referred to as a "source domain") in which source dataset 30 is acquired and an environment (hereinafter, also referred to as a "target domain") in which target dataset 50 is acquired.

Source dataset 30 basically includes a plurality of pieces of sample data whose ground truth is given. However, source dataset 30 may include the sample data whose ground truth is not given. Source dataset 30 corresponds to a first dataset including the plurality of pieces of sample data whose ground truth is given.

Target dataset 50 basically includes the plurality of pieces of sample data whose ground truth is not given. However, target dataset 50 may include the sample data whose ground truth is given. Target dataset 50 corresponds to a second dataset including the plurality of pieces of sample data whose ground truth is not given.

With reference to the examples in FIGS. 1 and 2, the environment generated by simulation corresponds to the source domain, and the environment actually captured by camera 20 corresponds to the target domain.

It is assumed that the learning dataset of the source domain is given by a set of $(x_s, y_s)$, and the learning dataset of the target domain is given only by $(x_t)$. At this point, $x_s$ and $x_t$ represent input vectors of the pieces of sample data among the source domain and the target domain, and $y_s$ represents the ground truth (label) given to the corresponding $x_s$. That is, it is assumed that the ground truth (label) is not given to the sample data among the target domain.

Under such a premise, it is a goal of the unsupervised domain adaptation problem to construct the trained model capable of inferring ground truth $Y_t$ to be given to a sample data group $X_t$ belonging to the target domain. That is, it is a goal to construct the trained model capable of calculating a distribution $Pr(y|X_t)$ in the state where the ground truth $Y_t$ does not exist.

A technique of solving the unsupervised domain adaptation problem according to the related art is to construct an encoder $E(z|x)$ that projects pieces of sample data $x_s$ to $X_s$ and pieces of sample data $x_t$ to $X_t$ having the same inference value onto the same feature value z.

At this point, a pair $(x_s, x_t)$ having the same inference value cannot be specified, that is, it is unknown which pair $(x_s, x_t)$ has the same inference value. For this reason, instead of training the encoder such that each pair has the same feature value, the encoder is trained such that the group has the same feature value. That is, as a group, the encoder is trained such that the shapes of the distribution $Pr(y|x_s$ to $X_s)$ and the distribution $Pr(y|x_t$ to $X_t)$ are matched with each other.

Figure 4:
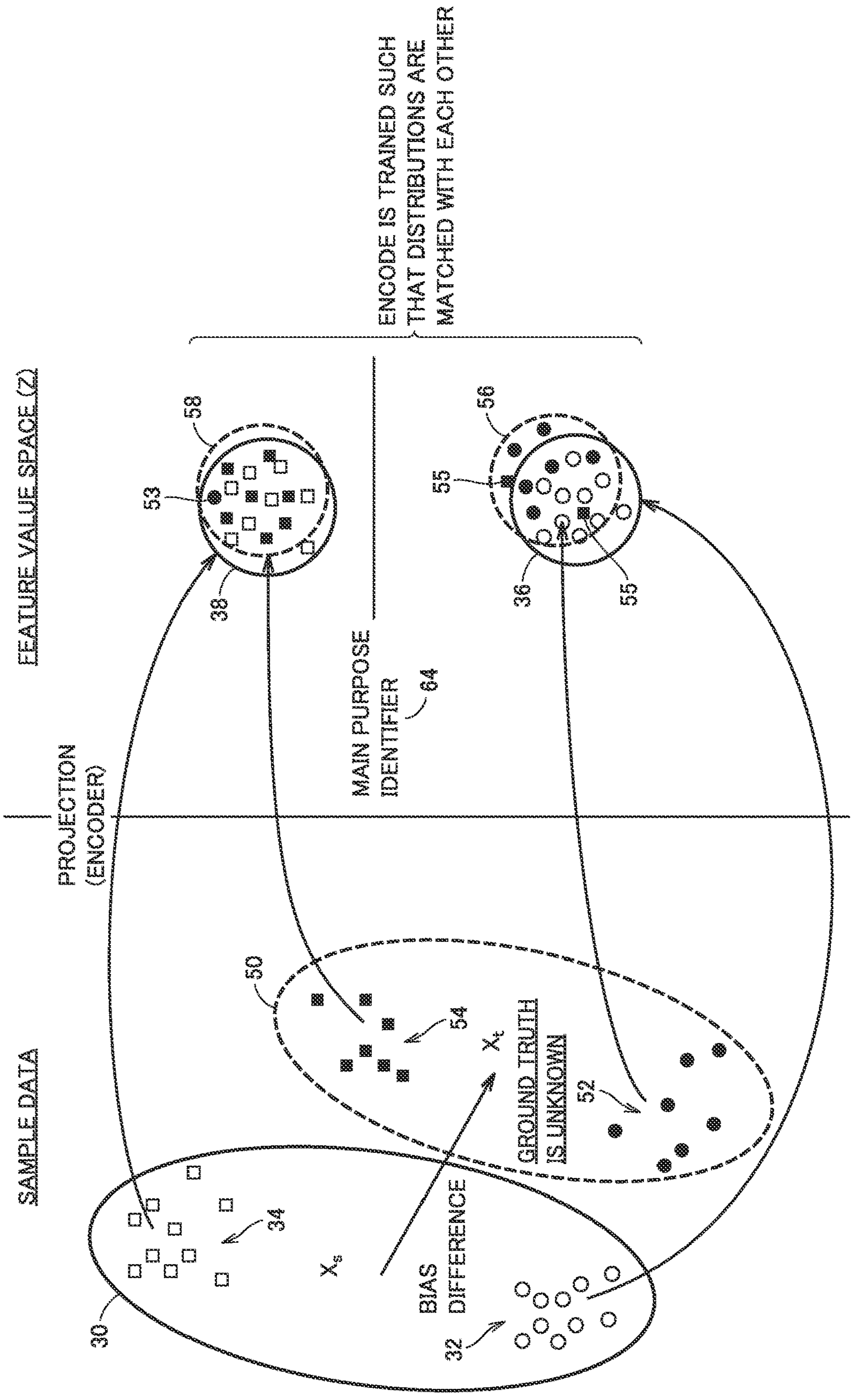
FIG. 4 is a view illustrating an example of a method for solving an unsupervised domain adaptation problem according to the related art of the invention.

FIG. 4 is a view illustrating an example of a method for solving the unsupervised domain adaptation problem according to the related art of the invention. With reference to FIG. 4, source dataset 30 and target dataset 50 are assumed. An unknown bias (or an unknown bias difference) exists between source dataset 30 and target dataset 50.

It is assumed that source dataset 30 (sample data group $X_s$) includes one or a plurality of pieces of sample data 32 to which a first ground truth (label) is given and one or a plurality of pieces of sample data 34 to which second ground truth (label) is given.

On the other hand, it is assumed that target dataset 50 (sample data group $X_t$) includes one or a plurality of pieces of sample data 52 to which the first ground truth (label) is to be given and one or a plurality of pieces of sample data 54 to which the second ground truth (label) is to be given. However, the ground truth of the sample data among target dataset 50 is unknown.

At this point, attention is paid to the distribution when the pieces of sample data among source dataset 30 and target dataset 50 are projected onto a feature value space by the encoder. It is assumed that pieces of sample data 32 and 34 among source dataset 30 are projected onto regions 36 and 38, respectively, and pieces of sample data 52 and 54 among target dataset 50 are projected onto regions 56 and 58, respectively.

The encoder is trained such that the shapes of the distributions of regions 36 and 38 and the distributions of regions 56 and 58 are matched with each other. Then, main purpose discriminator 64 that identifies regions 36 and 38 corresponding to the first ground truth (label) and regions 56 and 58 to which the second ground truth (label) is given is also trained. Inference model 60 (see FIG. 6) is generated from the encoder and main purpose discriminator 64.

Even when source dataset 30 including the sample data whose ground truth is assigned exists, the inference accuracy decreases for the data having different biases, but the decrease in the inference accuracy can be prevented by applying the encoder constructed by the above-described technique.

D. Solution Means (d1: Discovery of Problem)

As a result of intensive studies, the inventors of the present application have found an essential problem in the above-described technique and a solution for the problem. That is, in the above-described technique, it is assumed that the shapes of the distribution $Pr(y|x_s$ to $X_s)$ and the distribution $Pr(y|x_t$ to $X_t)$ are implicitly matched with each other. However, because the actual ground truth $Y_t$ is unknown, there is an essential problem that such assumption is made only by chance except for a special situation.

For example, as described above with reference to FIGS. 1 and 2, the correct frequency distributions are hardly matched between the image generated by the simulation and the image actually captured by camera 20.

As a result, as illustrated in FIG. 4, the data that is erroneously projected to the region 58 (erroneous projection sample data 53) may be generated among pieces of sample data 52 that need to be originally projected to region 56, and the data that is erroneously projected to region 56 (erroneous projection sample data 55) may be generated among pieces of sample data 54 that need to be projected to region 58. Because the ground truth is not given to the sample data among target dataset 50, the erroneous projection is theoretically impossible to be detected.

(d2: Outline of Solution Means)

In solution means of the embodiment, regardless of whether the shapes of the distribution $Pr(y|x_s$ to $X_s)$ and the distribution $Pr(y|x_t$ to $X_t)$ are matched with each other, the encoder $E(z|x)$ that projects pieces of sample data $x_s$ to $X_s$ and pieces of sample data $x_t$ to $X_t$ to the same feature value z is constructed by training.

More specifically, a technique called a cycleGAN is used to generate primary pseudo sample data $x'_t$ that will be the same inference value y as sample data $x_s$ in a pseudo manner. Then, the error is minimized such that feature value z calculated from sample data $x_s$ and a feature value z' calculated from primary pseudo sample data $x'_t$ have similar values.

In this technique, the encoder is trained for the purpose of matching the pairs having the same inference value. That is, the encoder is trained for the purpose of allowing pieces of sample data $x_s$ to $X_s$ and pieces of sample data $x_t$ to $X_t$ having the same inference value to be projected to the same feature value z. By adopting the learning method, the inference accuracy can be enhanced even when the shapes of the distribution $Pr(y|x_s$ to $X_s)$ and the distribution $Pr(y|x_t$ to $X_t)$ are different.

(d3: Basic Training Network)

Figure 5:
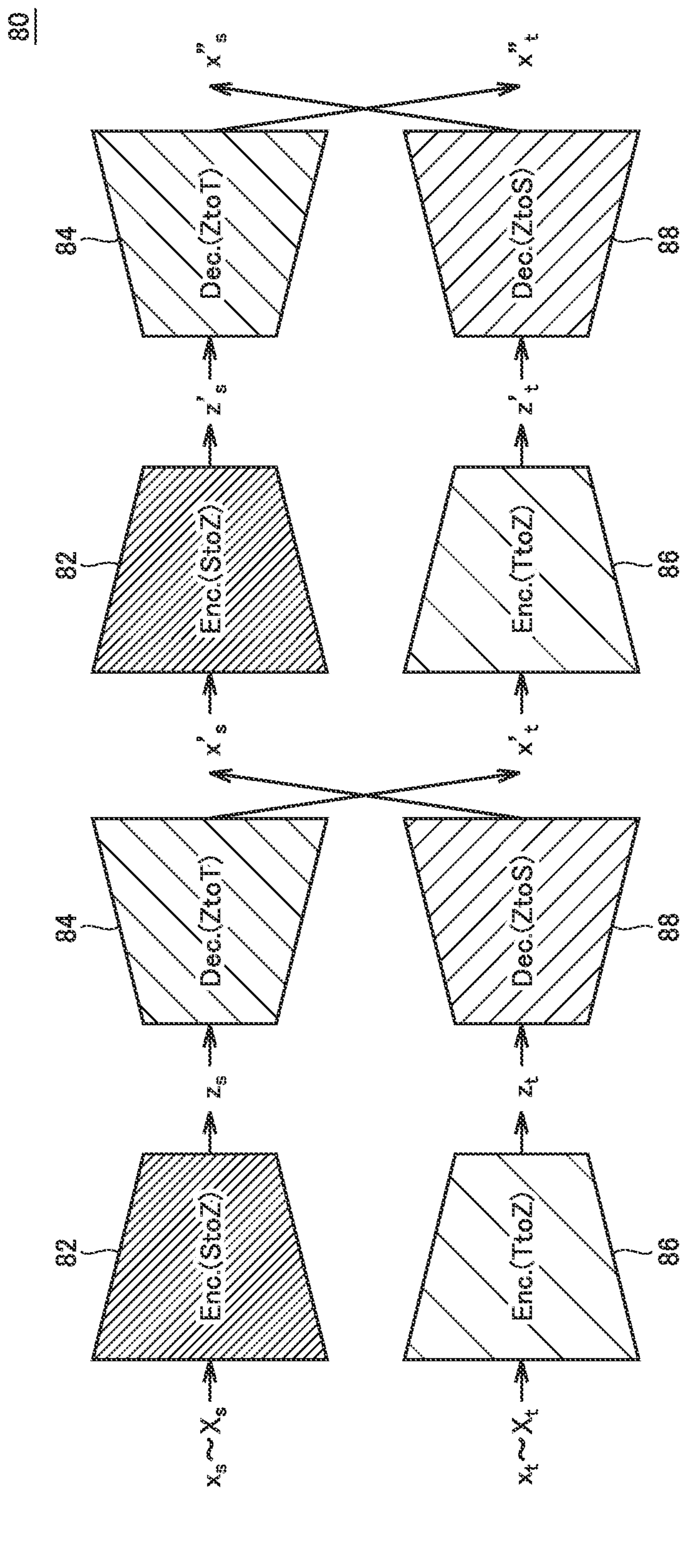
FIG. 5 is a schematic diagram illustrating an example of a training network constructing an encoder by a cycleGAN of the embodiment.

FIG. 5 is a schematic diagram illustrating an example of a training network 80 constructing the encoder by the cycleGAN of the embodiment. With reference to FIG. 5, training network 80 is a kind of adversarial network, and is a combination of two types of encoders and decoders. More specifically, training network 80 includes a set of encoder 82 and decoder 84 and a set of encoder 86 and decoder 88.

Encoder 82 is the trained model (StoZ) calculating the feature value from the sample data among source dataset 30, and decoder 84 is the trained model (ZtoT) inferring the sample data among target dataset 50 from the feature value.

Similarly, encoder 86 is the trained model (TtoZ) calculating the feature value from the sample data among target dataset 50, and decoder 88 is the trained model (ZtoS) inferring the sample data among source dataset 30 from the feature value.

Pieces of sample data $x_s$ to $X_s$ among source dataset 30 are input to the set of encoder 82 and decoder 84, and an output result thereof is input to the set of encoder 86 and decoder 88.

Similarly, pieces of sample data $x_t$ to $X_t$ among target dataset 50 are input to the set of encoder 86 and decoder 88, and an output result thereof is input to the set of encoder 82 and decoder 84.

Training network 80 includes two encoders 82, 86 and two decoders 84, 88, each of two encoders 82, 86 and two decoders 84, 88 shares the model parameter. Thus, the encoders and the decoders denoted by the same reference numerals are the same model.

The sample data $x_s$ among source dataset 30 is input to encoder 82, whereby a feature value $z_s$ of sample data $x_s$ is calculated. Feature value $z_s$ is input to decoder 84, whereby primary pseudo sample data $x'_t$ resembling the sample data belonging to target dataset 50 is calculated.

Furthermore, primary pseudo sample data $x'_t$ is input to encoder 86, whereby feature quantity $z'_t$ of primary pseudo sample data $x'_t$ is calculated. Feature value $z'_t$ is input to decoder 88, whereby secondary pseudo sample data $x''_s$ resembling the sample data belonging to source dataset 30 is calculated.

On the other hand, sample data $x_t$ among target dataset 50 is input to encoder 86, whereby a feature value $z_t$ of sample data $x_t$ is calculated. Feature value $z_t$ is input to decoder 88, whereby primary pseudo sample data $x'_s$ resembling the sample data belonging to source dataset 30 is calculated.

Furthermore, primary pseudo sample data $x'_s$ is input to encoder 82, whereby a feature value $z'_s$ of primary pseudo sample data $x'_s$ is calculated. Feature value $z'_s$ is input to decoder 84, whereby secondary pseudo sample data x"t resembling the sample data belonging to target dataset 50 is calculated.

Training network 80 that is the adversarial network is trained by the following procedures (1-1), (1-2), (2-1), (2-2), (3-1), (3-2). The execution of the procedures (3-1), (3-2) is arbitrary.

(1-1) The error between sample data $x_s$ belonging to source dataset 30 and calculated secondary pseudo sample data $x''_s$ is set as a 1-1 loss function, and the model parameters of encoders 82, 86 and decoders 84, 88 are optimized so as to minimize the value of the 1-1 loss function.

(1-2) The error between sample data $x_t$ belonging to target dataset 50 and calculated secondary pseudo sample data x"t is set as a 1-2 loss function, and the model parameters of encoders 82, 86 and decoders 84, 88 are optimized so as to minimize the value of the 1-2 loss function.

(2-1) The model parameters of encoders 82, 86 and decoders 84, 88 are optimized by a minmax strategy such that sample data $x_s$ belonging to source dataset 30 and primary pseudo sample data $x'_s$ can be distinguished using a discriminator (not illustrated) as a 2-1 loss function and such that the value of the 2-1 loss function is minimized (that is, in order to make the 2-1 loss function indistinguishable).

(2-2) Using the discriminator similar to (2-2), (2-1), the model parameters of encoders 82, 86 and decoders 84, 88 are optimized by the minmax strategy such that sample data $x_t$ belonging to target dataset 50 and primary pseudo sample data $x'_t$ can be distinguished from each other as a 2-2 loss function, and such that the value of the 2-2 loss function is minimized (that is, in order to make the 2-2 loss function indistinguishable).

At this point, the model parameter may be further optimized using an identity loss as a loss function. More specifically, the training may be performed by the following procedures (3-1) and (3-2).

(3-1) The error between sample data $x_s$ among source dataset 30 and primary pseudo sample data $x'_s$ calculated by inputting sample data $x_s$ to encoder 86 and decoder 88 is set as a 3-1 loss function, and the model parameters of encoder 86 and decoder 88 are optimized so as to minimize the value of the 3-1 loss function.

(3-2) The error between sample data $x_t$ among target dataset 50 and primary pseudo sample data $x'_t$ calculated by inputting sample data $x_t$ to encoder 82 and decoder 84 is set as a 3-2 loss function, and the model parameters of encoder 82 and decoder 84 are optimized so as to minimize the value of the 3-2 loss function.

According to the above procedure, each model parameter of training network 80 that is the adversarial network is optimized.

Figure 6:
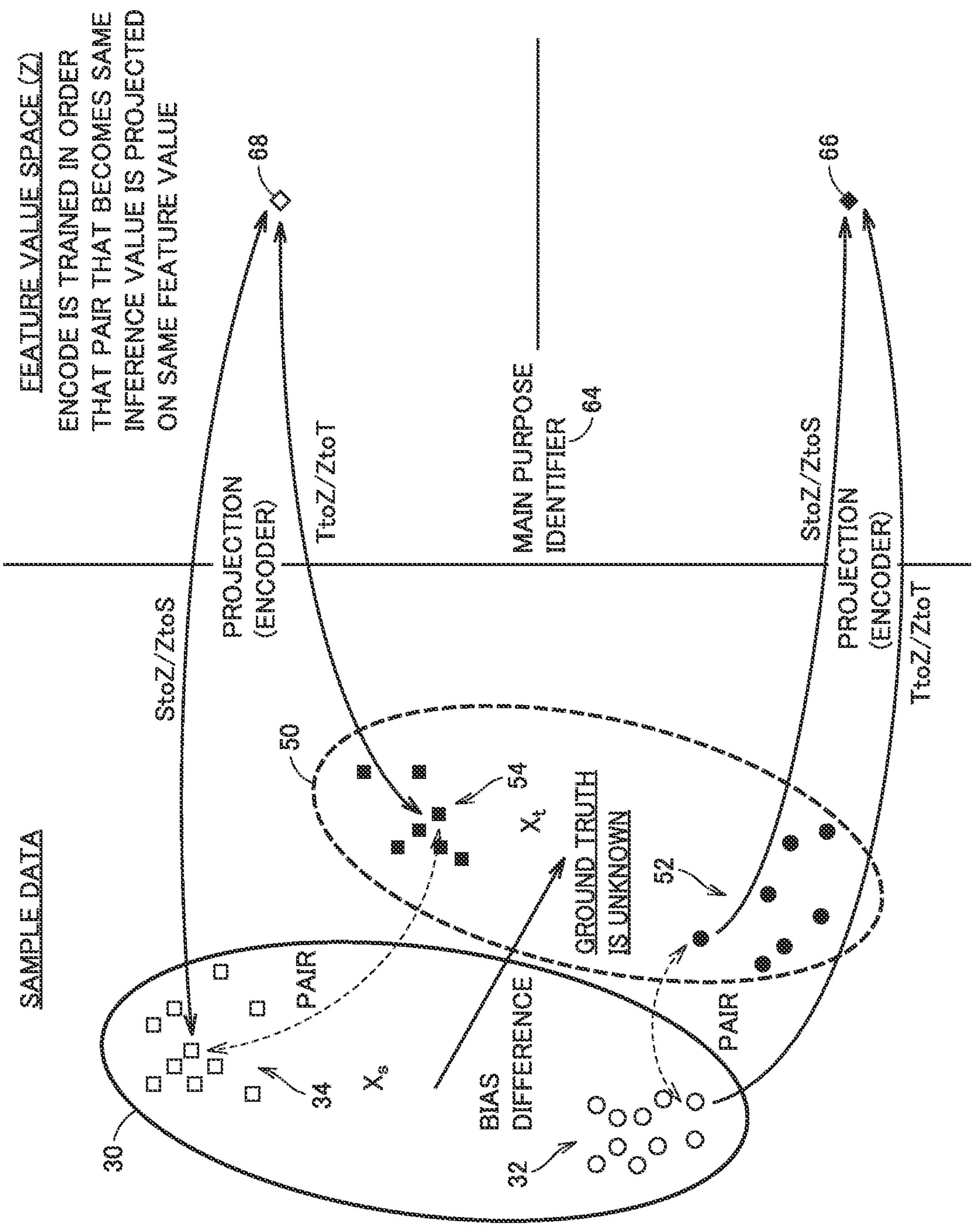
FIG. 6 is a view conceptually illustrating the construction of the encoder by the cycleGAN in FIG. 5.

FIG. 6 is a view conceptually illustrating the construction of the encoder by the cycleGAN in FIG. 5. With reference to FIG. 6, source dataset 30 and target dataset 50 are assumed. An unknown bias (or an unknown bias difference) exists between source dataset 30 and target dataset 50.

It is assumed that source dataset 30 (sample data group $X_s$) includes one or a plurality of pieces of sample data 32 to which first ground truth (label) is given and one or a plurality of pieces of sample data 34 to which second ground truth (label) is given.

On the other hand, it is assumed that target dataset 50 (sample data group $X_t$) includes one or a plurality of pieces of sample data 52 to which the first ground truth (label) is to be given and one or a plurality of pieces of sample data 54 to which the second ground truth (label) is to be given. However, the ground truth of the sample data among target dataset 50 is unknown.

At this point, the encoder is trained such that a pair of sample data 32 and sample data 52 having the first ground truth (label) as the inference value has the same feature value 66 among the pieces of sample data among source dataset 30 and target dataset 50.

Similarly, the encoder is trained such that a pair of sample data 34 and sample data 54 having the second ground truth (label) as the inference value has the same feature value 68 among the pieces of sample data among source dataset 30 and target dataset 50.

That is, training network 80 in FIG. 5 focuses on the pair of the sample data among source dataset 30 and the sample data among the target dataset, and calculates the other pseudo sample data (primary pseudo sample data) starting from one sample data and passing through the feature value space, and calculates one pseudo sample data (secondary pseudo sample data) starting from the other pseudo sample data (primary pseudo sample data) and passing through the feature value space. Also by such bidirectional projection (that is, calculation along the bidirectional path), the adversarial learning is executed for the purpose that the sample data among any dataset and the corresponding secondary simulated sample data are the same.

As described above, in training network 80 of FIG. 5, the encoder is trained for the purpose of matching the pairs having the same inference value. That is, the encoder is trained for the purpose of allowing pieces of sample data $x_s$ to $X_s$ and pieces of sample data $x_t$ to $X_t$ having the same inference value to be projected to the same feature value z. By adopting the learning method, it is possible to construct the high-accuracy encoder can be constructed without assuming that the shapes of the distribution $Pr(y|x_s$ to $X_s)$ and the distribution $Pr(y|x_t$ to $X_t)$ are matched with each other.

(d4: Improved Training Network)

As a result of further intensive research, the inventors of the present application have found that training network 80 in FIG. 5 can be further improved in the following points.

Figure 7:
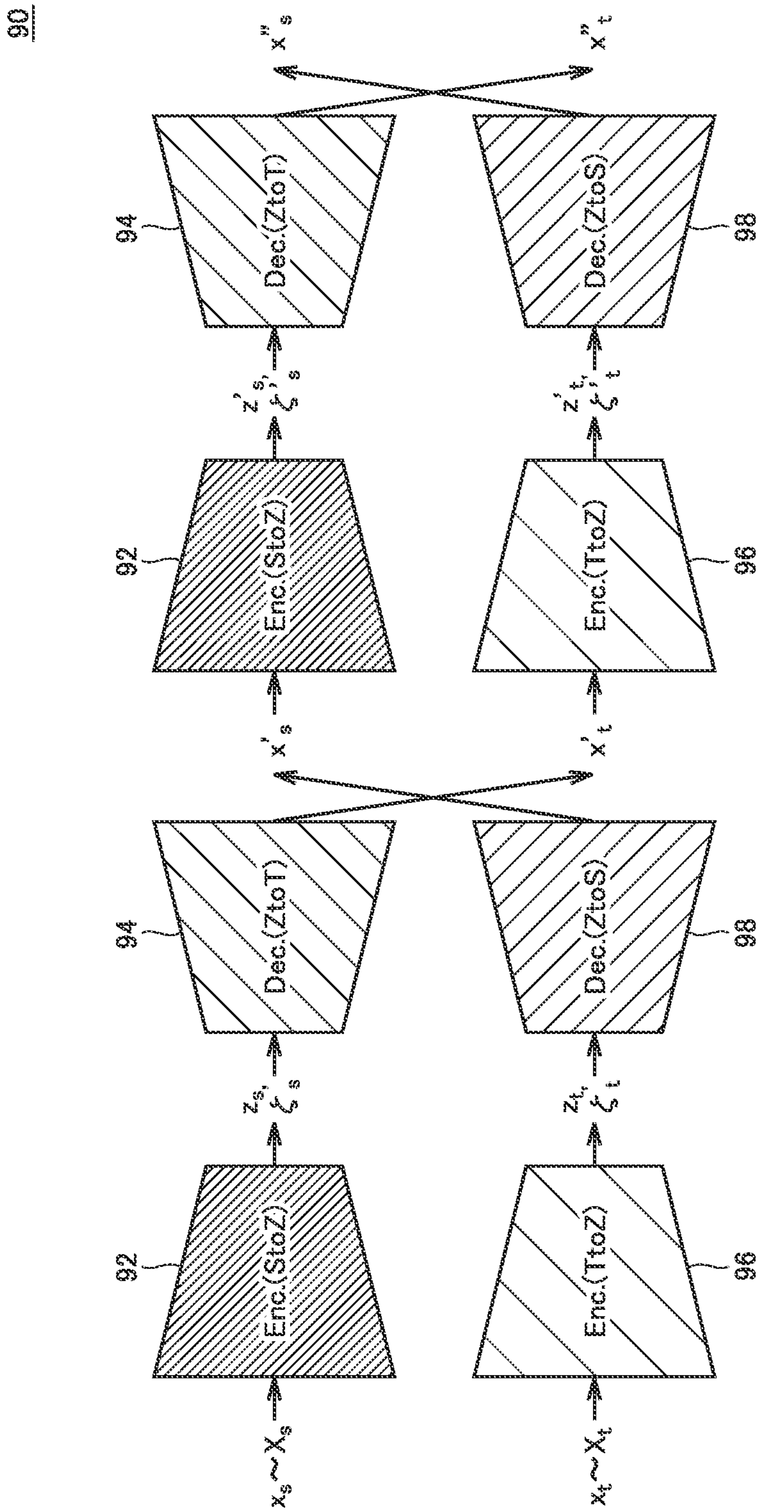
FIG. 7 is a schematic diagram illustrating an example of the training network constructing the encoder by the cycleGAN of the embodiment.

FIG. 7 is a schematic diagram illustrating an example of a training network 90 constructing the encoder by the cycleGAN of the embodiment. With reference to FIG. 7, training network 90 is a kind of adversarial network, and is a combination of two types of encoders and decoders. Inference model 60 is generated by training network 90 that is the adversarial network.

More specifically, training network 90 includes a set of an encoder 92 and a decoder 94 (encoder-decoder) and a set of an encoder 96 and a decoder 98 (encoder-decoder).

Training network 90 in FIG. 7 is different from training network 80 in FIG. 5 in that encoders 92 and 96 output two types of feature values z and a feature value The encoding results by encoders 92 and 96 are set as the two types of feature value z and feature value for the following reasons.

When the problem of estimating a variable b from a variable a is trained with variable b as the teacher data, variable a depends on variable b regardless of the presence or absence of the dependency relation between variable a and variable b. For training network 80 in FIG. 5, feature value z should have the same value regardless of whether feature value z is in the source domain or the target domain. However actually, because there is a portion predicting sample data $x_s$ and sample data $x_t$ from feature value z, feature value z depends on sample data $x_s$ or sample data $x_t$ according to the prediction path.

Thus, by separating feature value ζ that holds this dependence relationship from feature value z independent of the prediction path, the (z,ζ) as a whole depends on the domain, but the feature value z alone can be independent of the domain. Thus, domain independence can be implemented in minimization of 4-1 and 4-2 loss functions as described below.

In other words, it can be considered that feature value ζ indicates content information and feature value z indicates information for each domain.

In this manner, encoders 92, 96 calculate feature value z (feature values $z_s$ and $z_t$) independent of source dataset 30 and target dataset 50 and feature value ζ dependent on source dataset 30 or target dataset 50 from the sample data.

Then, encoders 92, 96 are trained such that, with respect to a pair of the sample data $x_s$ among source dataset 30 and sample data $x_t$ which is among target dataset 50 and whose ground truth is to be the same as the ground truth of sample data $x_s$ (that is, the same inference value is to be obtained), the same feature value z (independent feature values $z_s$ and $z_t$) is calculated from both the sample data $x_s$ and the sample data $x_t$.

That is, the encoder is trained for the purpose of allowing pieces of sample data $x_s$ to $X_s$ and pieces of sample data $x_t$ to $X_t$ having the same inference value to be projected to same feature value z (independent feature values $z_s$ and $z_t$).

As described above, in training network 90, the model parameter is optimized by focusing on feature values z (feature values $z_s$ and $z_t$) independent of source dataset 30 and target dataset 50.

More specifically, a technique called a cycleGAN is used to generate primary pseudo sample data $x'_t$ that will be the same inference value y as sample data $x_s$ in a pseudo manner. Then, the error is minimized such that feature value z calculated from sample data $x_s$ and a feature value z' calculated from primary pseudo sample data $x'_t$ have similar values.

In the training using training network 90, sample data $x_s$ among source dataset 30 is input to a network (first network) in which a set of encoder 92 and decoder 94 (first encoder-decoder) and a set of encoder 96 and decoder 98 (second encoder-decoder) are disposed in this order.

On the other hand, sample data $x_t$ among target dataset 50 is input to a network (second network) in which a set of encoder 96 and decoder 98 (second encoder-decoder) and a set of encoder 92 and decoder 94 (first encoder-decoder) are disposed in this order.

Training network 90, which is the adversarial network in FIG. 7, is trained by the following procedures (1-1), (1-2), (2-1), (2-2), (3-1), (3-2), (4-1), (4-2), (5). The execution of the procedures (3-1), (3-2) is arbitrary.

(1-1) The error between sample data $x_s$ belonging to source dataset 30 and calculated secondary pseudo sample data $x''_s$ is set as a 1-1 loss function, and the model parameters of encoders 92, 96 and decoders 94, 98 are optimized so as to minimize the value of the 1-1 loss function.

(1-2) The error between sample data $x_t$ belonging to target dataset 50 and calculated secondary pseudo sample data $x''_t$ is set as a 1-2 loss function, and the model parameters of encoders 92, 96 and decoders 94, 98 are optimized so as to minimize the value of the 1-2 loss function.

(2-1) Using the discriminator (not illustrated), the model parameters of encoders 92, 96 and decoders 94, 98 are optimized by the minmax strategy such that sample data $x_s$ belonging to source dataset 30 and primary pseudo sample data $x'_s$ can be distinguished from each other as the 2-1 loss function, and such that the value of the 2-1 loss function is minimized (that is, in order to make the 2-1 loss function indistinguishable).

(2-2) Using the discriminator similar to (2-1), the model parameters of encoders 92, 96 and decoders 94, 98 are optimized by the minmax strategy such that sample data $x_t$ belonging to target dataset 50 and primary pseudo sample data $x'_t$ can be distinguished from each other as the 2-2 loss function, and such that the value of the 2-2 loss function is minimized (that is, in order to make the 2-2 loss function indistinguishable).

At this point, the model parameter may be further optimized using an identity loss as a loss function. More specifically, the training may be performed by the following procedures (3-1) and (3-2).

(3-1) The error between sample data $x_s$ among source dataset 30 and primary pseudo sample data $x'_s$ calculated by inputting sample data $x_s$ to encoder 96 and decoder 98 is set as the 3-1 loss function, and the model parameters of encoder 96 and decoder 98 are optimized so as to minimize the value of the 3-1 loss function.

(3-2) The error between sample data $x_t$ among target dataset 50 and primary pseudo sample data $x'_t$ calculated by inputting sample data $x_t$ to encoder 92 and decoder 94 is set as the 3-2 loss function, and the model parameters of encoder 92 and decoder 94 are optimized so as to minimize the value of the 3-2 loss function.

Subsequently, the training is performed focusing on feature value z.

(4-1) For sample data $x_s$ belonging to source dataset 30, the error between feature value $z_s$ output from encoder 92 and pseudo characteristic amount $z'_t$ output from encoder 96 at the subsequent stage is set as a 4-1 loss function, and the model parameters of encoders 92, 96 and decoders 94, 98 are optimized so as to minimize the value of the 4-1 loss function.

(4-2) For sample data $x_t$ belonging to target dataset 50, the error between feature value $z_t$ output from encoder 96 and pseudo characteristic amount $z'_s$ output from encoder 92 at the subsequent stage is set as a 4-2 loss function, and the model parameters of encoders 92, 96 and decoders 94, 98 are optimized so as to minimize the value of the 4-2 loss function.

Furthermore, the training the main purpose discriminator 64 is performed.

(5) For sample data $x_s$ belonging to source dataset 30, the error between inference value y output by inputting feature value $z_s$ output from encoder 92 to main purpose discriminator 64 and ground truth $y_s$ of sample data $x_s$ is set as a fifth loss function, and the model parameters of encoder 92 and main purpose discriminator 64 are optimized so as to minimize the value of the fifth loss function. In this way, main purpose discriminator 64 to which feature value $z_s$ output from encoder 92 is input is trained based on sample data $x_s$ among source dataset 30 and the corresponding ground truth.

The processing (5) may be executed using sample data $x_t$ to which the ground truth is given, sample data $x_t$ being among target dataset 50. That is, main purpose discriminator 64 may be trained based on the sample data among each dataset (source dataset 30 and/or target dataset 50) and the corresponding ground truth.

Figure 8:
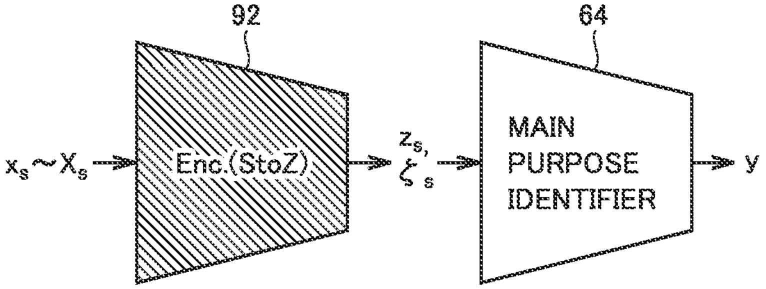
FIG. 8 is a schematic diagram illustrating an example of a method for constructing a main purpose discriminator using the training network in FIG. 7.

FIG. 8 is a schematic diagram illustrating an example of a method for constructing main purpose discriminator 64 using training network 90 in FIG. 7. With reference to FIG. 8, the processing (5) is performed focusing on encoder 92 and main purpose discriminator 64.

According to the above procedure, each model parameter of training network 90 that is the adversarial network is optimized.

Figure 9:
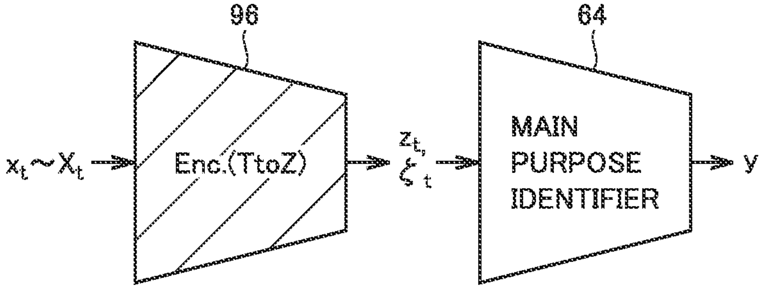
FIG. 9 is a schematic diagram illustrating an example of a network in an operation phase of the encoder constructed using the training network in FIG. 7.

FIG. 9 is a schematic diagram illustrating an example of a network in an operation phase of the encoder constructed using training network 90 in FIG. 7. With reference to FIG. 9, in the operation phase, the network including encoder 96 and main purpose discriminator 64 is used as the inference model. That is, inference value y is calculated by inputting feature value z (feature value $\zeta$ is not used) calculated by inputting arbitrary sample data x to encoder 96 to main purpose discriminator 64.

Figure 10:
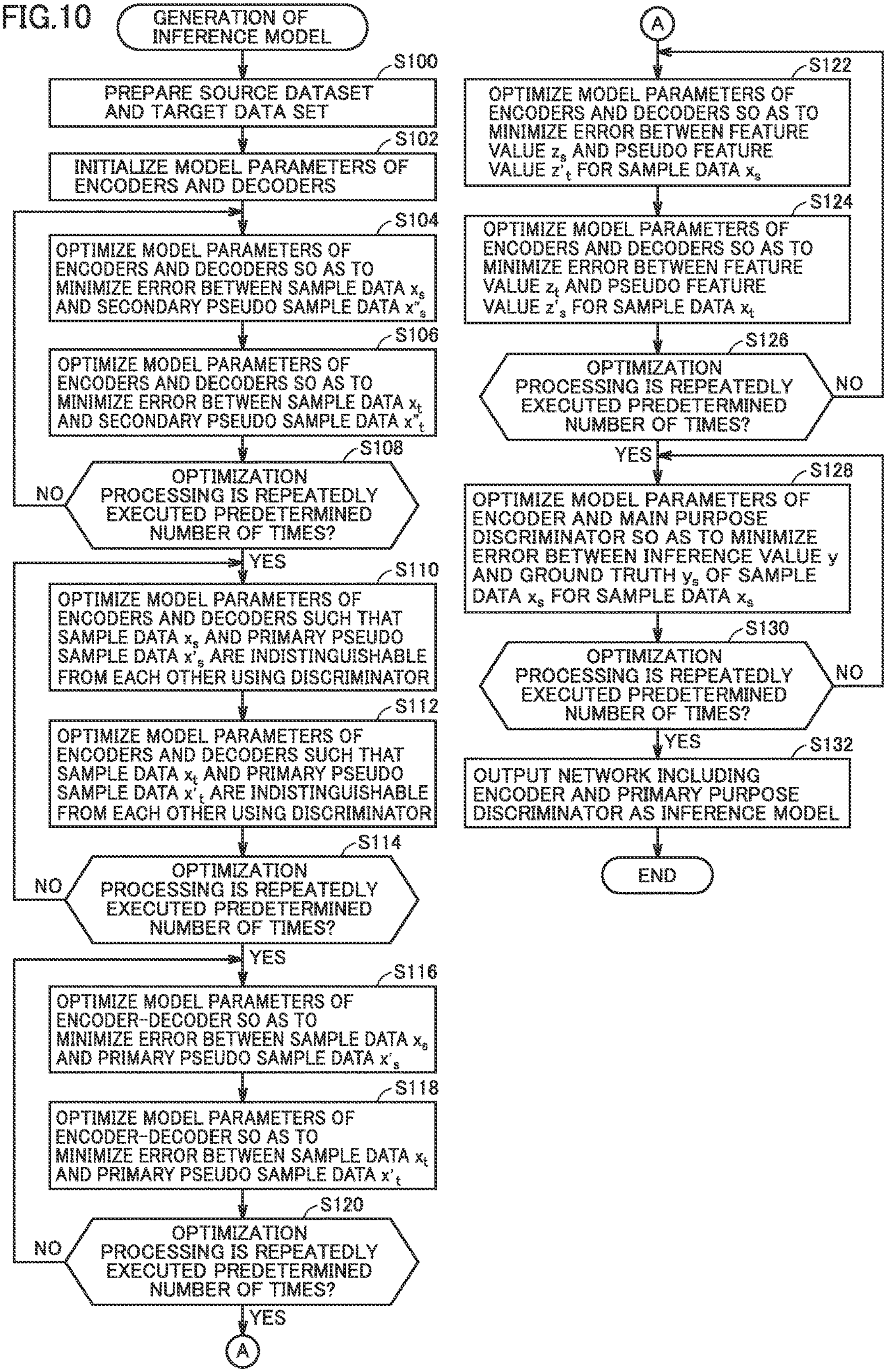
FIG. 10 is a flowchart illustrating the processing procedure of generating the inference model of the embodiment.

FIG. 10 is a flowchart illustrating the processing procedure of generating the inference model of the embodiment. Typically, each step in FIG. 10 is implemented by processor 102 executing machine learning program 114 (see FIG. 3).

With reference to FIG. 10, source dataset 30 and target dataset 50 are prepared (step S100).

Processor 102 initializes the model parameters of encoders 92, 96 and decoders 94, 98 configuring training network 90 in FIG. 7 (step S102). Then, processor 102 executes the following model parameter optimization processing.

Processor 102 optimizes the model parameters of encoders 92, 96 and decoders 94, 98 so as to minimize the error between sample data $x_s$ belonging to source dataset 30 and calculated secondary pseudo sample data $x''_s$ (step S104). In addition, processor 102 optimizes the model parameters of encoders 92, 96 and decoders 94, 98 so as to minimize the error between sample data $x_t$ belonging to target dataset 50 and calculated secondary pseudo sample data $x''_t$ (step S106).

Processor 102 determines whether the optimization processing in steps S104 and S106 is repeatedly executed a predetermined number of times (step S108). When the optimization processing in steps S104 and S106 is not repeatedly executed the predetermined number of times (NO in step S108), the processing in steps S104 and S106 is repeated.

When the optimization processing in steps S104 and S106 is repeatedly executed the predetermined number of times (YES in step S108), processor 102 optimizes the model parameters of encoders 92, 96 and decoders 94, 98 such that sample data $x_s$ belonging to source dataset 30 and primary pseudo sample data $x'_s$ cannot be distinguished from each other using the discriminator (step S110). In addition, processor 102 optimizes the model parameters of encoders 92, 96 and decoders 94, 98 such that sample data $x_t$ belonging to target dataset 50 and primary pseudo sample data $x'_t$ are indistinguishable from each other using the discriminator (step S112).

Processor 102 determines whether the optimization processing in steps S110 and S112 is repeatedly executed a predetermined number of times (step S114). When the optimization processing of steps S110 and S112 is not repeatedly executed the predetermined number of times (NO in step S114), the processing in steps S110 and S112 is repeated.

When the optimization processing in steps S110 and S112 is repeatedly executed the predetermined number of times (YES in step S114), processor 102 optimizes the model parameters of encoder 96 and decoder 98 so as to minimize the error between sample data $x_s$ among source dataset 30 and primary pseudo sample data $x'_s$ calculated by inputting sample data $x_s$ to encoder 96 and decoder 98 (step S116). In addition, processor 102 optimizes the model parameters of encoder 92 and decoder 94 so as to minimize the error between sample data $x_t$ among target dataset 50 and primary pseudo sample data $x'_t$ calculated by inputting sample data $x_t$ to encoder 92 and decoder 94 (step S118).

Processor 102 determines whether the optimization processing in steps S116 and S118 is repeatedly executed a predetermined number of times (step S120). When the optimization processing in steps S116 and S118 is not repeatedly executed the predetermined number of times (NO in step S120), the processing in steps S116 and S118 is repeated.

When the optimization processing in steps S116 and S118 is repeatedly executed the predetermined number of times (YES in step S120), processor 102 optimizes the model parameters of encoders 92, 96 and decoders 94, 98 so as to minimize the error between feature value $z_s$ output from encoder 92 and pseudo feature value $z'_t$ output from encoder 96 at the subsequent stage for sample data $x_s$ belonging to source dataset 30 (step S122). In addition, processor 102 optimizes the model parameters of encoders 92, 96 and decoders 94, 98 so as to minimize the error between feature value $z_t$ output from encoder 96 and pseudo feature value $z'_s$ output from encoder 92 at the subsequent stage for sample data $x_t$ belonging to target dataset 50 (step S124).

Processor 102 determines whether the optimization processing in steps S122 and S124 is repeatedly executed a predetermined number of times (step S126). When the optimization processing in steps S122 and S124 is not repeatedly executed the predetermined number of times (NO in step S126), the processing in steps S122 and S124 is repeated.

When the optimization processing in steps S122 and S124 is repeatedly executed the predetermined number of times (YES in step S126), processor 102 optimizes the model parameters of encoder 92 and main purpose discriminator 64 so as to minimize the error between inference value y output by inputting feature value $z_s$ output from encoder 92 to main purpose discriminator 64 and ground truth $y_s$ of sample data $x_s$ for sample data $x_s$ belonging to source dataset 30 (step S128).

Processor 102 determines whether the optimization processing in step S128 is repeatedly executed a predetermined number of times (step S130). When the optimization processing in step S128 is not repeatedly executed the predetermined number of times (NO in step S130), the processing in step S128 is repeated.

When the optimization processing in step S128 is repeatedly executed the predetermined number of times (YES in step S130), processor 102 outputs the network including encoder 96 and main purpose discriminator 64 as the inference model (step S132).

As described above, the inference model generation processing ends. Then, the inference processing can be operated using the generated inference model.

(d5: Model Parameter Sharing)

A part of the model parameter of inference model 40 (training network 90) may be shared.

Figure 11:
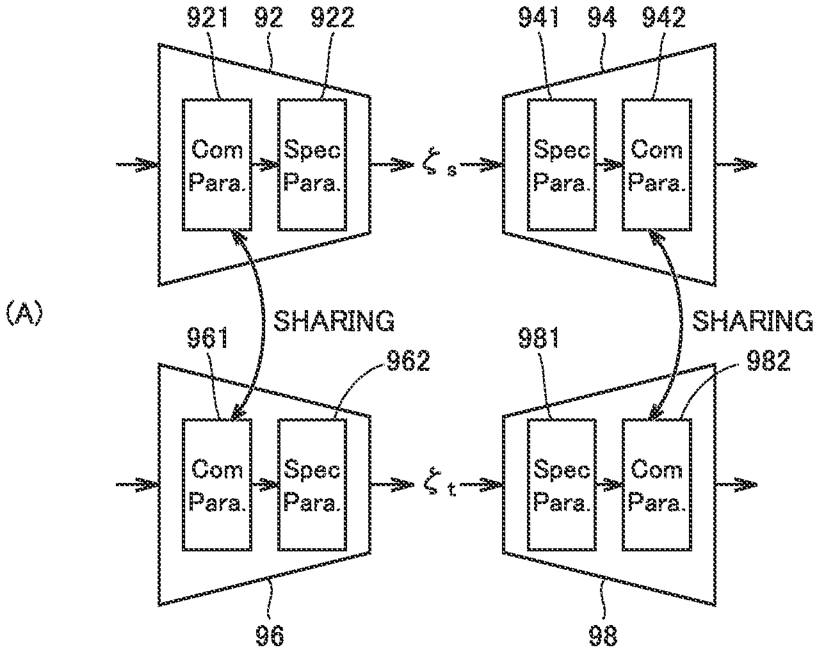
FIG. 11 is a view illustrating an example of model parameter sharing in the inference model of the embodiment.
Figure 11:
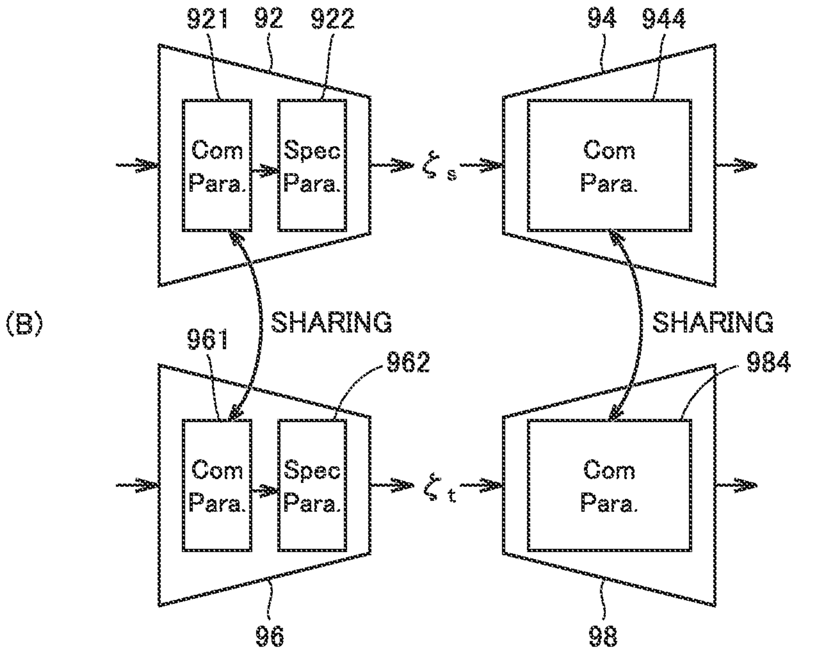

FIG. 11 is a view illustrating an example of model parameter sharing in the inference model of the embodiment. With reference to FIG. 11, for example, the model parameter related to the calculation of feature value ζ may be shared between a set (encoder-decoder) of encoder 92 and decoder 94 and a set (encoder-decoder) of encoder 96 and decoder 98. For convenience of description, a portion related to the calculation of feature value z is not illustrated.

In the example of FIG. 11(A), a part of the model parameter is shared between encoder 92 and encoder 96.

More specifically, encoder 92 includes a shared parameter 921 that defines internal processing on the input side and an individual parameter 922 that defines internal processing on the output side. Similarly, encoder 96 includes a shared parameter 961 that defines internal processing on the input side and an individual parameter 962 that defines internal processing on the output side.

When encoder 92 and encoder 96 are configured by a neural network, individual parameter 922 and individual parameter 962 correspond to a portion that defines the output of a feature value $\zeta(\zeta_s,\zeta_t)$ in the final layer. Individual parameter 922 and individual parameter 962 have individual values at encoder 92 and encoder 96, respectively. On the other hand, shared parameter 921 and shared parameter 961 on the input side are shared with each other.

Furthermore, in the example of FIG. 11(A), a part of the model parameters may be shared between decoder 94 and decoder 98.

More specifically, decoder 94 includes an individual parameter 941 that defines internal processing on the input side and a shared parameter 942 that defines internal processing on the output side. Similarly, decoder 98 includes an individual parameter 981 that defines internal processing on the input side and a shared parameter 982 that defines internal processing on the output side.

When decoder 94 and decoder 98 are configured by a neural network, individual parameter 941 and individual parameter 981 correspond to a portion that absorbs a difference between input feature values $\zeta(\zeta_s,\zeta_t)$. Individual parameter 941 and individual parameter 981 have individual values in decoder 94 and decoder 98, respectively. On the other hand, output-side shared parameter 942 and output-side shared parameter 98 are shared with each other.

In the example of FIG. 11(B), the model parameters related to feature value $\zeta(\zeta_s,\zeta_t)$ are shared between decoder 94 and decoder 98. More specifically, decoder 94 has a shared parameter 944, and decoder 98 has a shared parameter 984. Shared parameter 944 and shared parameter 984 are shared with each other. Shared parameter 944 and shared parameter 984 are adapted so as to receive one of feature values $\zeta_s,\zeta_t$. That is, the configuration in FIG. 11(B) corresponds to a modification in which individual parameter 941 and individual parameter 981 are also shared with each other in the configuration in FIG. 11(A).

In this way, the inference model can be more efficiently trained by sharing the model parameters related to feature value ζ.

In addition, the amount of information used to determine the output of feature value $\zeta(\zeta_s,\zeta_t)$ can be increased by sharing the model parameters. As a result, it is easy to output the same feature value z for the input having the same inference value y.

E. Experimental Example of Performance Result

An experimental example of a performance result of the inference model of the embodiment will be described below.

Figure 12:
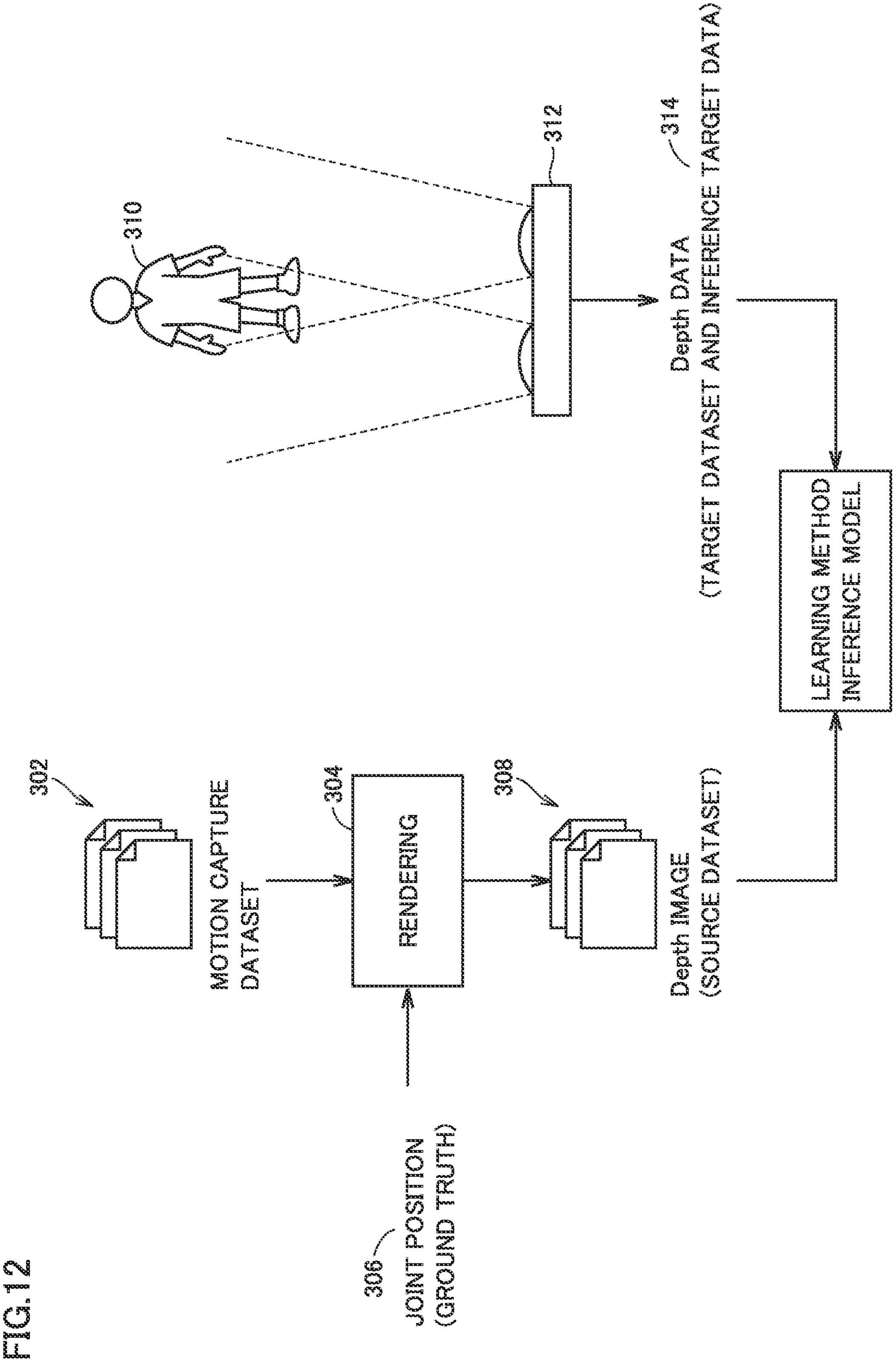
FIG. 12 is a schematic diagram illustrating an experimental example of a performance result of the inference model of the embodiment.

FIG. 12 is a schematic diagram illustrating an experimental example of the performance result of the inference model of the embodiment. An inference task of a person posture is targeted in the experimental example of FIG. 12. The inference task of the person posture is a type of regression task from the image.

Specifically, a depth image generated by rendering (304) an arbitrary posture among a known motion capture dataset 302 was used as a source dataset 308. Ground truth 306 (label) of a joint position was manually given to each depth image. The inference result as a panoptic segmentation task is the type and the position of the joint position among the input image.

On the other hand, a target dataset 314 is configured by the depth image obtained by actually imaging a user 310 using a stereoscopic camera 312.

The inference model according to the panoptic segmentation task was constructed.

Figure 13:
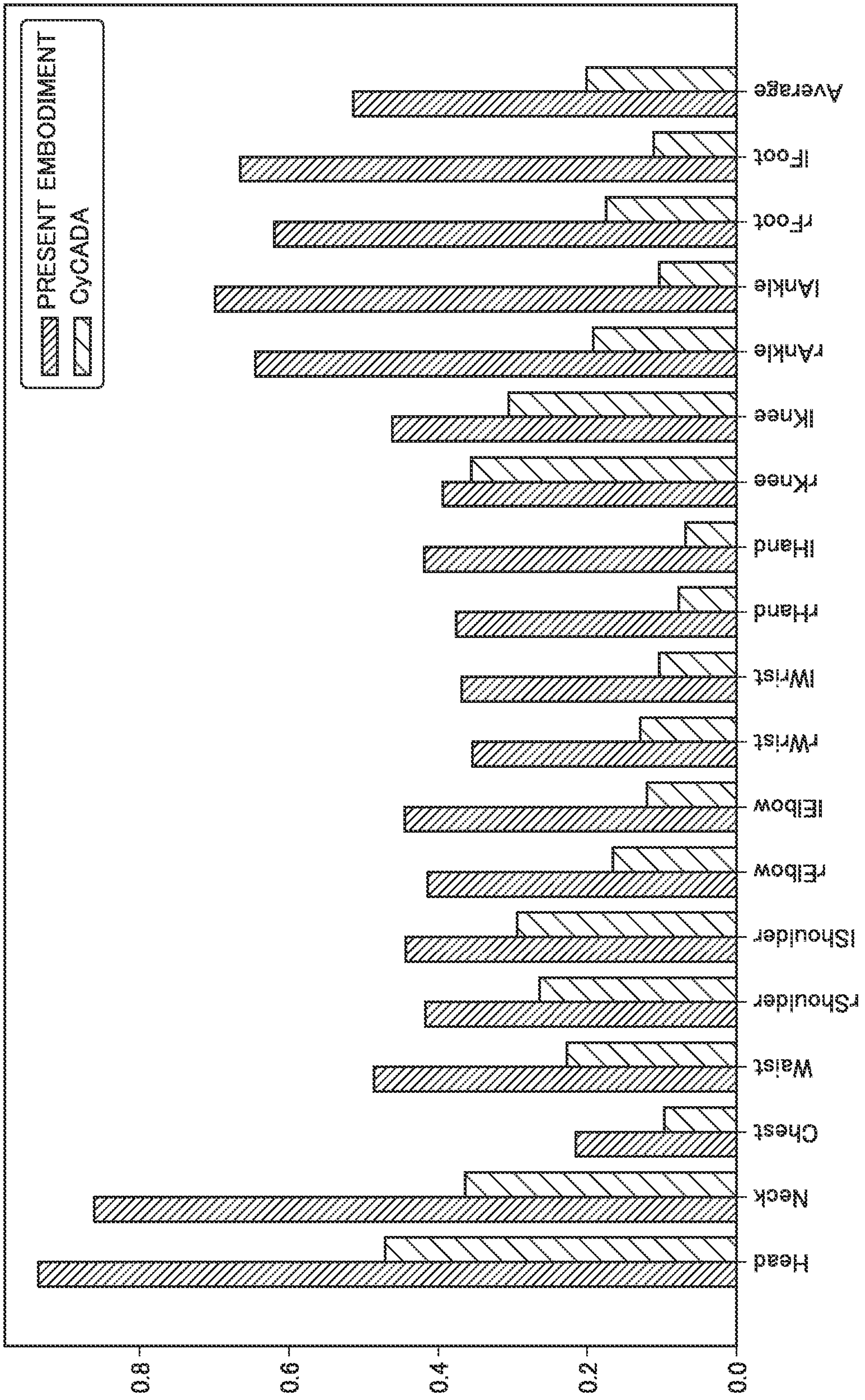
FIG. 13 is a view illustrating an example of performance evaluation in the experiment in FIG. 12.

FIG. 13 is a view illustrating an example of performance evaluation in the experiment in FIG. 12. The performance evaluation in FIG. 13 indicates a probability, in which the inference target data is input to the inference model and the inference result (joint position) for the input inference target data is located within 10 pixels in a two-dimensional space with respect to the ground truth. The performance evaluation in FIG. 13 is obtained by evaluating deviation (2DPose) on the image.

In the performance evaluation of FIG. 13, a technique called "CyCADA" disclosed in NPL 1 was used as a baseline. With reference to FIG. 13, it can be seen that the inference model of the embodiment has the higher inference accuracy for any region than the baseline.

As described above, by adopting the inference model and the learning method thereof of the embodiment, it can be seen that the higher inference performance can be implemented as compared with the related art.

F. Modifications (f1: Dispersed Disposition)

The configuration in which robot controller 100 of the embodiment executes the processing of collecting target dataset 50 and the processing of generating inference model 60 has been exemplified. However, the present invention is not limited to the configuration, and any configuration can be adopted.

Figure 14:
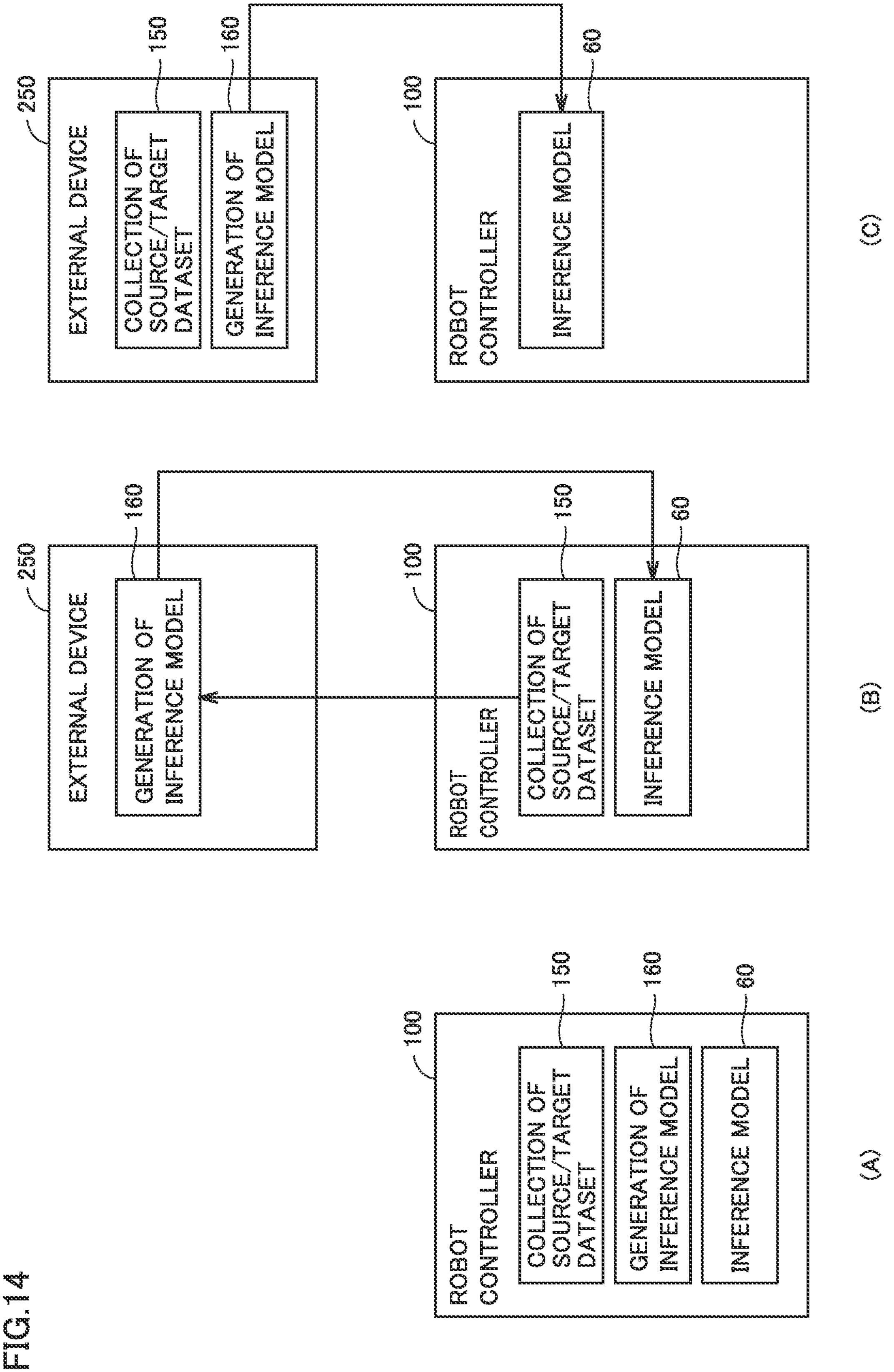
FIG. 14 is a schematic diagram illustrating a configuration example of an inference system in which the inference model of the embodiment is used.

FIG. 14 is a schematic diagram illustrating a configuration example of the inference system in which the inference model of the embodiment is used.

FIG. 14(A) illustrates a configuration example in which robot controller 100 executes processing 150 of collecting source dataset 30 and target dataset 50, processing 160 of generating inference model 60, and inference processing using inference model 60.

FIG. 14(B) illustrates a configuration example in which robot controller 100 and an external device 250 such as a server are linked. In this configuration example, robot controller 100 executes processing 150 of collecting source dataset 30 and target dataset 50 and inference processing using inference model 60, and external device 250 executes processing 160 of generating inference model 60.

FIG. 14(C) also illustrates a configuration example in which robot controller 100 and external device 250 such as a server are linked. In this configuration example, external device 250 executes processing 150 of collecting source dataset 30 and target dataset 50 and processing 160 of generating inference model 60, and robot controller 100 executes inference processing using inference model 60.

FIG. 14 illustrates some typical configuration examples, and the technical scope of the present invention is not limited to these configuration examples. Any implementation can be employed depending on the requirements, specifications, objectives required, and the like.

(f2: Dataset and Inference Target Data)

In the robot system of FIGS. 1 and 2, an example in which the source dataset is generated from the image (CG image) generated by the simulation and the target dataset is generated from the image (live image) actually captured by the camera is illustrated. However, the present invention is not limited thereto, and arbitrary information can be used as the dataset. In addition, a plurality of source datasets and/or a plurality of target datasets may be used.

For example, for both the CG image and the live-action image, both or one of a 2D color image (hereinafter, also referred to as an "RGB image") and the depth image can be generated or acquired. In this case, a first source dataset including the RGB image (whose ground truth is given) of CG and a second source dataset including the depth image (whose ground truth is given) of CG can be prepared, and it is possible to prepare a first target dataset including the RGB image (no ground truth) of the live image and a second source dataset including the depth image (no ground truth) of the live image can be prepared.

The inference model that inputs the RGB image or the depth image of the live image as the inference target data and outputs the recognition result can be constructed using the source dataset and the target dataset.

Furthermore, a third source dataset including a 3D image (whose ground truth is given) of CG including RGB information and depth information and a third target dataset including a 3D image of the live image (no ground truth) can be prepared.

The source dataset may include data whose ground truth is not given, or the target dataset may include data whose ground truth is given.

(f3: Training Network According to Many Datasets)

In the case of using the larger number of source datasets and target datasets, the training network in which the encoders and decoders are connected to each other may be adopted such that the adversarial network can be configured between arbitrary datasets while the set (encoder-decoder) of the encoder and the decoder is appropriately increased according to the number of datasets to be used.

(f4: Network Structure of Encoder-Decoder)

The network having the data structure according to the number of dimensions of the input sample data, the type of included information, and the like can be adopted as the set of the encoder and the decoder (encoder-decoder). Consequently, the encoder-decoder to which the sample data of the source dataset is input and the encoder-decoder to which the sample data of the target dataset is input may adopt the same network structure or different network structures.

For example, the encoder-decoder to which the RGB image is input and the encoder-decoder to which the depth image is input are different in the number of channels for each pixel, so that the number of dimensions and the like in each layer including the input layer are different. Alternatively, when the target dataset including text data is used while the source dataset including the image data is used, algorithm itself may be different. Specifically, CNN may be adopted as the encoder-decoder to which the image data is input, and RNN, 1D-CNN, or the like may be adopted as the encoder-decoder to which the text data is input.

G. Application Examples

In the above description, an example in which the bias difference between the image (CG image) generated by the simulation and the image (live image) actually captured by the camera is absorbed has been described. However, the inference model of the embodiment is not limited to this implementation example, but can be applied to any application. That is, an "environment" or a "domain" can be interpreted as broadly as possible.

Arbitrary information observed by an arbitrary sensing device can be applied by the technique of the embodiment even when an observation condition and an observation environment are different. For example, in the technical field of factory automation (FA), an environmental difference of an application destination factory, facility, or the like can be compensated by applying the learning method of the embodiment.

As a specific application example, in a defect inspection model trained using manually annotated image data, the defect inspection model adapted to the site may be generated by additionally learning the image data whose ground truth label (presence or absence of the defect) collected in the site is not given as the target dataset. Alternatively, the defect inspection model applicable to a product of the same type may be generated using the image data (whose ground truth label is given) obtained by capturing an image of a certain product as the source dataset, and using the image data obtained by capturing an image of a product of the same type having a slightly-changed appearance as the target dataset.

The technique of the embodiment can also be applied to the case where the inference model inferring the posture of a worker is generated. For example, in many cases, the camera cannot be disposed in front of the worker in order to grasp a behavior of the worker. In such cases, the camera is required to be disposed above the worker to capture the image of the worker from directly above. When the camera is disposed above the worker, the position of the joint of the worker that does not appear in the field of view of the camera is hardly appropriately annotated. However, according to the technique of the embodiment, because the CG image (source dataset) in the visual field corresponding to the position where the camera is actually disposed can be generated, the posture of the worker can be easily inferred from the image actually captured by the camera by generating the posture inference model using the source dataset generated in this way.

Furthermore, a sensor that does not actually exist can be virtually implemented using the result of the simulation as the source dataset. For example, the source dataset is obtained by giving force field data in the state of being aligned with a coordinate system in the image to the CG image generated by the simulation as the ground truth label. In addition, the image data (observation data) (no ground truth label) captured by the camera or the like is set as a target domain. A force field inference model is generated using the source dataset and the target dataset and the image data captured at arbitrary timing is input to the force field inference model as inference target data, so that a force field generated at an arbitrary position can be inferred.

In the simulation, the generated force can be expressed as the force field (the force field becomes the inference target) at the portion where acting force and reaction force are generated by contact between objects. On the other hand, it is difficult to actually measure the force field.

The force field that cannot be conventionally observed only by the image can be inferred using the force field inference model generated by the technique of the embodiment. That is, the sensor that does not actually exist can be virtually implemented.

Furthermore, the embodiment can be applied not only to physical information observed by a sensing device but also to artificial information such as a sales result at an electronic commerce (EC) site. For example, it is assumed that an application inferring a sales record in a certain EC site based on a sales record in another EC site.

As described above, the learning method of the embodiment and the application destination of the inference model generated by the learning method can be applied to various pieces of observable information existing in the real world.

H. Appendix

The above embodiment includes the following technical ideas.

[Configuration 1]

An inference system (1) including:

a learning unit (102;114) configured to generate an inference model (60) using a first dataset (30) comprising a plurality of sample data whose ground truth is given and a second dataset (50) comprising a plurality of sample data whose ground truth is not given; and an inference unit (102;118) configured to input inference target data (70) that can belong to the second dataset to the inference model to determine an inference result (62), wherein the inference model comprises an encoder (96) configured to calculate from the sample data a first feature value independent of the first dataset and the second dataset and a second feature value dependent on the first dataset or the second dataset, and the learning unit is configured to train the encoder such that a same first feature value is calculated from both first sample data and second sample data for a pair of the first sample data among the first dataset and the second sample data which is among the second dataset and whose ground truth it to be identical to the ground truth of the first sample data.

[Configuration 2]

The inference system according to the configuration 1, wherein the learning unit is configured to generate the inference model by a training network (90) that is an adversarial network.

[Configuration 3]

The inference system according to the configuration 2, wherein the training network comprises:

a first encoder-decoder comprising a first encoder (92) and a first decoder (94); and a second encoder-decoder comprising a second encoder (96) and a second decoder (98), and in training by the learning unit, a sample among the first dataset is input to a first network (92,94,96,98) in which the first encoder-decoder and the second encoder-decoder are disposed in this order, and a sample among the second dataset is input to a second network (96,98,92,94) in which the second encoder-decoder and the first encoder-decoder are disposed in this order.

[Configuration 4]

The inference system according to the configuration 3, wherein the learning unit is configured to optimize model parameters of the first encoder, the first decoder, the second encoder, and the second decoder such that an error between the first feature value output from the first encoder and a first pseudo feature value output from the second encoder is minimized by inputting the sample among the first dataset to the first network, and the learning unit is configured to optimize the model parameters of the first encoder, the first decoder, the second encoder, and the second decoder such that an error between the first feature value output from the second encoder and a first pseudo feature value output from the first encoder is minimized by inputting the sample among the second dataset to the second network.

[Configuration 5]

The inference system according to any one of the configurations 1 to 4, wherein the learning unit is further configured to train a discriminator (64) to which output from the encoder is input based on sample data among the first dataset and a corresponding ground truth, and the inference model further comprises the discriminator.

[Configuration 6]

An inference device comprising:

a storage (110) configured to hold an inference model (60) generated by training using a first dataset (30) comprising a plurality of sample data whose ground truth is given and a second dataset (50) comprising a plurality of sample data whose ground truth is not given; and an inference unit (102;118) configured to input inference target data (70) that can belong to the second dataset to the inference model to determine an inference result (62), wherein the inference model comprises an encoder (96) configured to calculate from the sample data a first feature value independent of the first dataset and the second dataset and a second feature value dependent on the first dataset or the second dataset, and the encoder is trained such that a same first feature value is calculated from both first sample data and second sample data for a pair of the first sample data among the first dataset and the second sample data among the second dataset and whose ground truth is to be identical to the ground truth of the first sample data.

[Configuration 7]

An inference method comprising:

generating an inference model (60) using a first dataset (30) comprising a plurality of sample data whose ground truth is given and a second dataset (50) comprising a plurality of sample data whose ground truth is not given; and inputting inference target data (70) that can belong to the second dataset to the inference model to determine an inference result (62), wherein the inference model comprises an encoder (96) configured to calculate from the sample data a first feature value independent of the first dataset and the second dataset and a second feature value dependent on the first dataset or the second dataset, and the generating the inference model comprises training the encoder such that a same first feature value is calculated from both first sample data and second sample data for a pair of the first sample data among the first dataset and the second sample data which is among the second dataset and whose ground truth it to be identical to the ground truth of to the first sample data.

I. Effects

According to the embodiment, the trained model with higher inference performance can be generated.

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: robot system, 2: robot, 4: shaft, 6: hand, 8: workpiece, 12: servo driver, 14: motor, 20: camera, 30, 308: source dataset, 32, 34, 52, 54: sample data, 36, 56, 58: region, 40, 60: inference model, 50, 314: target dataset, 53, 55: projection sample data, 62: inference result, 64: main purpose discriminator, 66, 68: feature value, 70: inference target data, 80, 90: training network, 82, 86, 92, 96: encoder, 84, 88, 94, 98: decoder, 100: robot controller, 102: processor, 104: main memory, 110: storage, 114: machine learning program, 116: model parameter, 118: control application, 122: communication interface, 124: input unit, 126: output unit, 128: camera interface, 130: motor interface, 150, 160: processing, 200: simulation device, 250: external device, 302: motion capture dataset, 306: ground truth, 310: user, 312: stereoscopic vision camera, 921, 942, 944, 961, 982, 984: shared parameter, 922, 941, 962, 981: individual parameter

The invention claimed is:

1. An inference system comprising:

one or more memories storing instructions, and one or more processors configured to access the one or more memories and execute the instructions to cause the one or more processors to implement:

a learning unit configured to generate an inference model using a source dataset comprising a plurality of sample data whose ground truth is given and a target dataset comprising a plurality of sample data whose ground truth is not given, the source dataset comprising images generated by a simulation device and the target dataset comprising images captured by a camera; and an inference unit configured to input inference target data to the inference model to determine an inference result, wherein:

the learning unit is configured to:

initialize model parameters of a training network comprising a first path to which the source dataset is input and a second path to which the target dataset is input, a first encoder-decoder comprising a first encoder and a first decoder and a second encoder-decoder comprising a second encoder and a second decoder are disposed in this order in the first path, the second encoder-decoder and the first encoder-decoder are disposed in this order in the second path, optimize model parameters of the training network so as to minimize an error between sample data belonging to the source dataset and pseudo sample data output from the second encoder-decoder in the first path and to minimize an error between sample data belonging to the target dataset and pseudo sample data output from the first encoder-decoder in the second path, optimize model parameters of the training network such that sample data belonging to the source dataset and pseudo sample data output from the second encoder-decoder in the second path are indistinguishable from each other and such that sample data belonging to the target dataset and pseudo sample data output from the first encoder-decoder in the first path are indistinguishable from each other, and optimize model parameters of the training network so as to minimize an error between sample data belonging to the source dataset and pseudo sample data output from the second encoder-decoder in the second path and to minimize an error between sample data belonging to the target dataset and pseudo sample data output from the first encoder-decoder in the first path, the inference model comprises the second encoder and a main purpose discriminator, and the learning unit is further configured to optimize model parameters of the first encoder and the main purpose discriminator so as to minimize an error between an inference value output from the main purpose discriminator and ground truth of sample data belonging to the source dataset.

2. The inference system according to claim 1, wherein the training network is an adversarial network.

3. The inference system according to claim 1, wherein:

a part of the model parameters of the first encoder of the first encoder-decoder and a part of the model parameters of the second encoder of the second encoder-decoder are shared.

4. An inference device comprising:

a storage configured to hold an inference model generated by training using a source dataset comprising a plurality of sample data whose ground truth is given and a target dataset comprising a plurality of sample data whose ground truth is not given, the source dataset comprising images generated by a simulation device and the target dataset comprising images captured by a camera;

one or more memories storing instructions; and one or more processors configured to access the one or more memories and execute the instructions to cause the one or more processors to implement:

an inference unit configured to input inference target data to the inference model to determine an inference result, wherein:

the inference model is generated by optimizing model parameters of a training network comprising a first path to which the source dataset is input and a second path to which the target dataset is input, a first encoder-decoder comprising a first encoder and a first decoder and a second encoder-decoder comprising a second encoder and a second decoder are disposed in this order in the first path, the second encoder-decoder and the first encoder-decoder are disposed in this order in the second path, the optimizing the model parameters comprising:

optimizing model parameters of the training network so as to minimize an error between sample data belonging to the source dataset and pseudo sample data output from the second encoder-decoder in the first path and to minimize an error between sample data belonging to the target dataset and pseudo sample data output from the first encoder-decoder in the second path, optimizing model parameters of the training network such that sample data belonging to the source dataset and pseudo sample data output from the second encoder-decoder in the second path are indistinguishable from each other and such that sample data belonging to the target dataset and pseudo sample data output from the first encoder-decoder in the first path are indistinguishable from each other, and optimizing model parameters of the training network so as to minimize an error between sample data belonging to the source dataset and pseudo sample data output from the second encoder-decoder in the second path and to minimize an error between sample data belonging to the target dataset and pseudo sample data output from the first encoder-decoder in the first path, the inference model comprises the second encoder and a main purpose discriminator, and the optimizing the model parameters comprises optimizing model parameters of the first encoder and the main purpose discriminator so as to minimize an error between an inference value output from the main purpose discriminator and ground truth of sample data belonging to the source dataset.

5. The inference device according to claim 4, wherein the training network is an adversarial network.

6. The inference device according to claim 4, wherein:

a part of the model parameters of the first encoder of the first encoder-decoder and a part of the model parameters of the second encoder of the second encoder-decoder are shared.

7. A method of generating an inference model, the method comprising:

preparing a source dataset comprising a plurality of sample data whose ground truth is given and a target dataset comprising a plurality of sample data whose ground truth is not given, the source dataset comprising images generated by a simulation device and the target dataset comprising images captured by a camera;

optimizing model parameters of a training network comprising a first path to which the source dataset is input and a second path to which the target dataset is input, a first encoder-decoder comprising a first encoder and a first decoder and a second encoder-decoder comprising a second encoder and a second decoder are disposed in this order in the first path, the second encoder-decoder and the first encoder-decoder are disposed in this order in the second path, the optimizing the model parameters comprising:

optimizing model parameters of the training network so as to minimize an error between sample data belonging to the source dataset and pseudo sample data output from the second encoder-decoder in the first path and to minimize an error between sample data belonging to the target dataset and pseudo sample data output from the first encoder-decoder in the second path, optimizing model parameters of the training network such that sample data belonging to the source dataset and pseudo sample data output from the second encoder-decoder in the second path are indistinguishable from each other and such that sample data belonging to the target dataset and pseudo sample data output from the first encoder-decoder in the first path are indistinguishable from each other, and optimizing model parameters of the training network so as to minimize an error between sample data belonging to the source dataset and pseudo sample data output from the second encoder-decoder in the second path and to minimize an error between sample data belonging to the target dataset and pseudo sample data output from the first encoder-decoder in the first path; and constructing the inference model using the second encoder, the inference model comprising a main purpose discriminator, wherein:

the optimizing the model parameters further comprises:

optimizing model parameters of the first encoder and the main purpose discriminator so as to minimize an error between an inference value output from the main purpose discriminator and ground truth of sample data belonging to the source dataset.

8. The method according to claim 7, wherein the training network is an adversarial network.

9. The method according to claim 7, wherein:

a part of the model parameters of the first encoder of the first encoder-decoder and a part of the model parameters of the second encoder of the second encoder-decoder are shared.

* * * * *